(12) United States Patent
Ohno et al.

(10) Patent No.: US 12,187,165 B2
(45) Date of Patent: Jan. 7, 2025

(54) SEAT CONTROL DEVICE, SEAT CONTROL METHOD, NON-TRANSITORY RECORDING MEDIUM

(71) Applicant: TOYOTA JIDOSHA KABUSHIKI KAISHA, Toyota (JP)

(72) Inventors: Mitsuyoshi Ohno, Miyoshi (JP); Hideyuki Sakurai, Toyota (JP); Hiroyuki Tomita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 17/874,853

(22) Filed: Jul. 27, 2022

(65) Prior Publication Data
US 2023/0053743 A1 Feb. 23, 2023

(30) Foreign Application Priority Data
Aug. 18, 2021 (JP) ................. 2021-133605

(51) Int. Cl.
*B60N 2/02* (2006.01)
*B60N 2/00* (2006.01)
*B60N 2/01* (2006.01)
*B60R 11/02* (2006.01)

(52) U.S. Cl.
CPC ......... *B60N 2/0244* (2013.01); *B60N 2/0021* (2023.08); *B60N 2/003* (2023.08); *B60N 2/01* (2013.01); *B60R 11/0229* (2013.01); *B60N 2/0268* (2023.08); *B60N 2/0272* (2023.08); *B60N 2210/24* (2023.08); *B60N 2230/30* (2023.08)

(58) Field of Classification Search
CPC ........ B60N 2/0244; B60N 2/002; B60N 2/01; B60N 2/0272; B60N 2/0268; B60R 11/0229
See application file for complete search history.

(56) References Cited

U.S. PATENT DOCUMENTS 10,675,994 B2 * 6/2020 Fitzpatrick ............... B60N 2/14

FOREIGN PATENT DOCUMENTS

| JP | 2006520721 A | * | 9/2006 |
|----|--------------|---|--------|
| JP | 2009-208594 A | | 9/2009 |
| JP | 2019-186654 A | | 10/2019 |
| JP | 2019-206192 A | | 12/2019 |
| JP | 2020-055503 A | | 4/2020 |
| JP | 6769407 B2 | * | 10/2020 |

* cited by examiner

*Primary Examiner* — Aryan E Weisenfeld
*Assistant Examiner* — Shivam Sharma
(74) *Attorney, Agent, or Firm* — Dinsmore & Shohl LLP

(57) ABSTRACT

A seat control device includes a memory and a processor coupled to the memory. The processor is configured to, based on a selection by an occupant of a vehicle, select a video display area for displaying a video from among a plurality of video display areas provided at the vehicle, determine an adjustment amount corresponding to the determined video display area for a vehicle seat provided in the vehicle, and, via a modulation section, modulate a position and posture of the vehicle seat based on the determined adjustment amount of the vehicle seat.

12 Claims, 16 Drawing Sheets

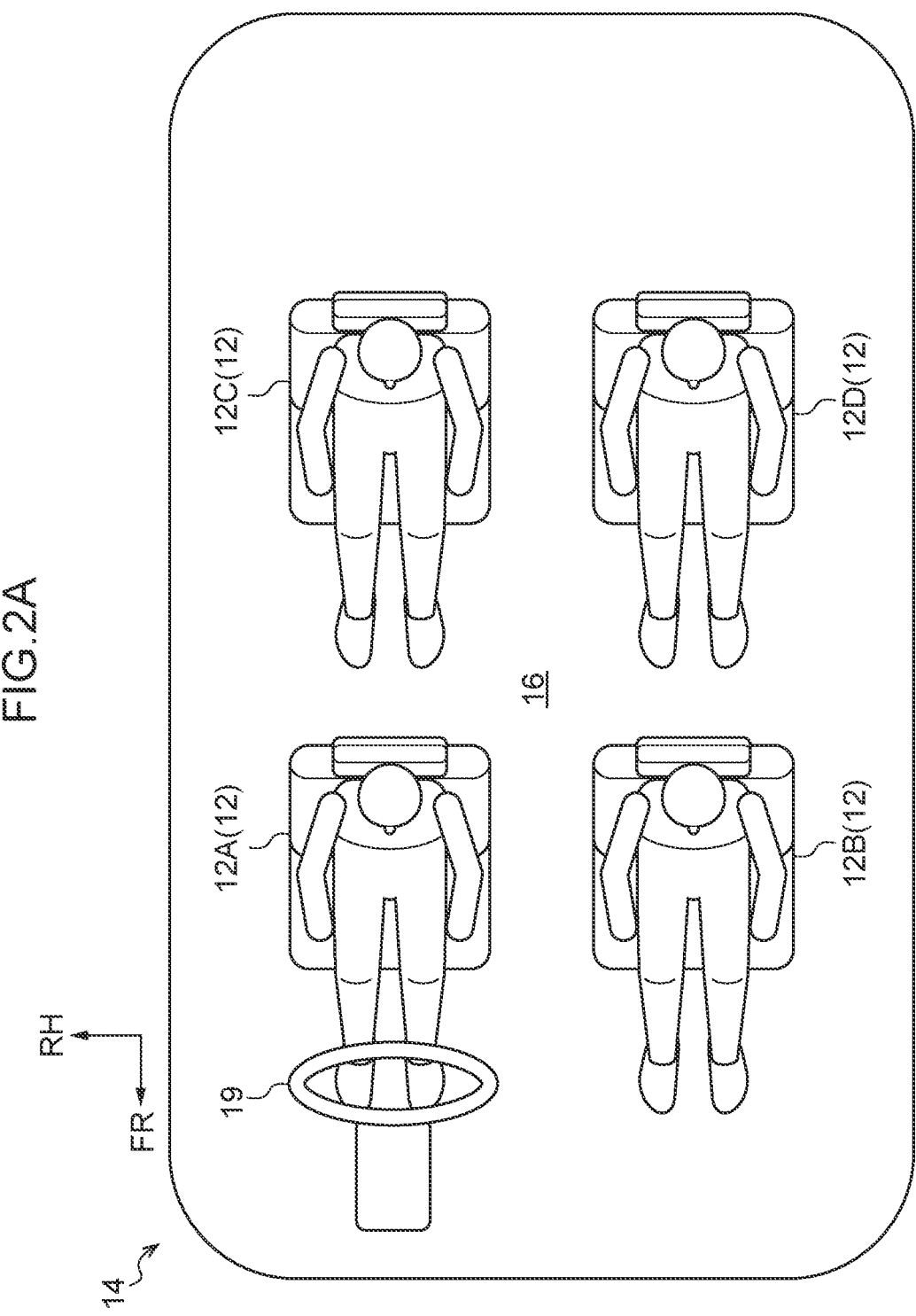

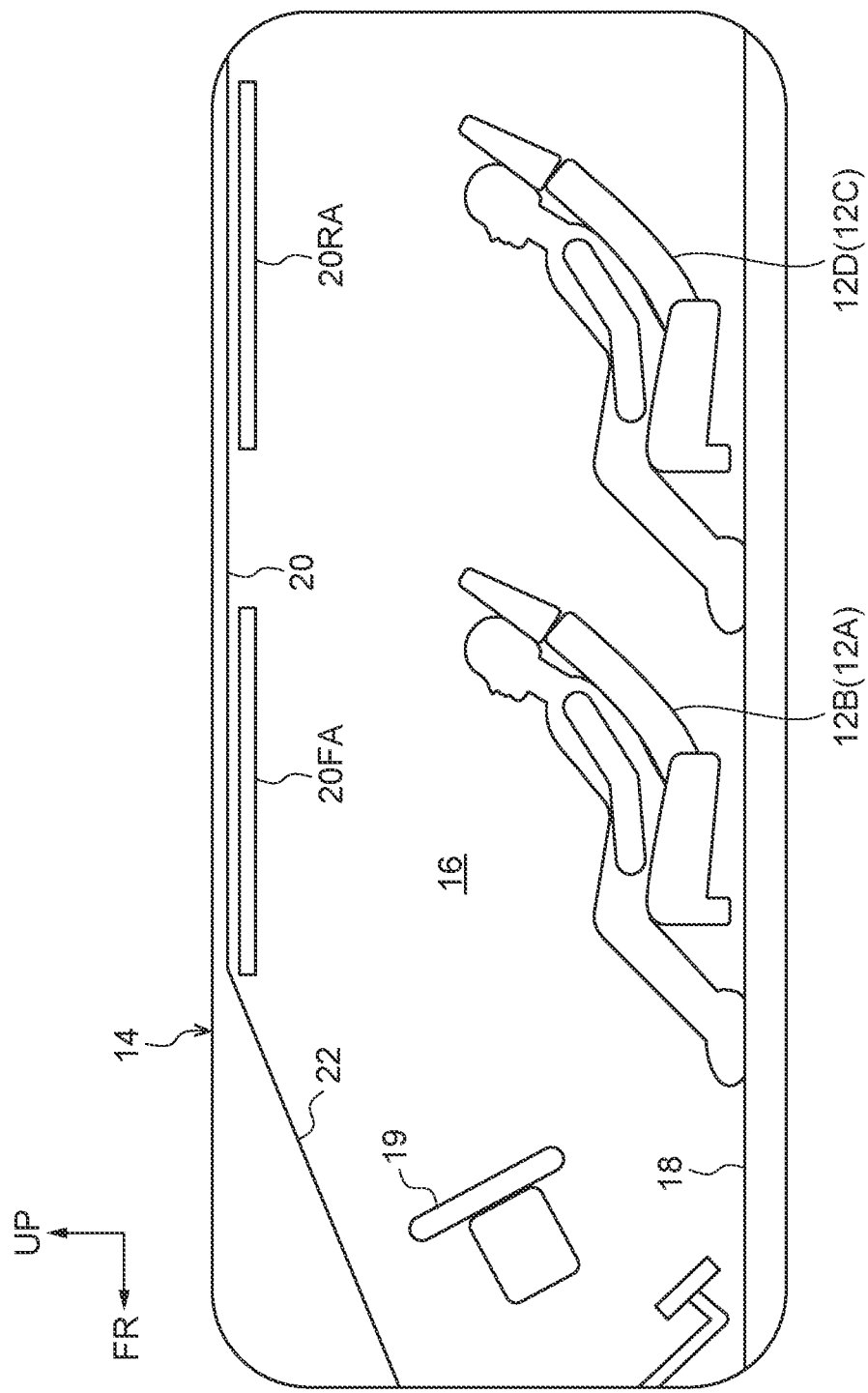

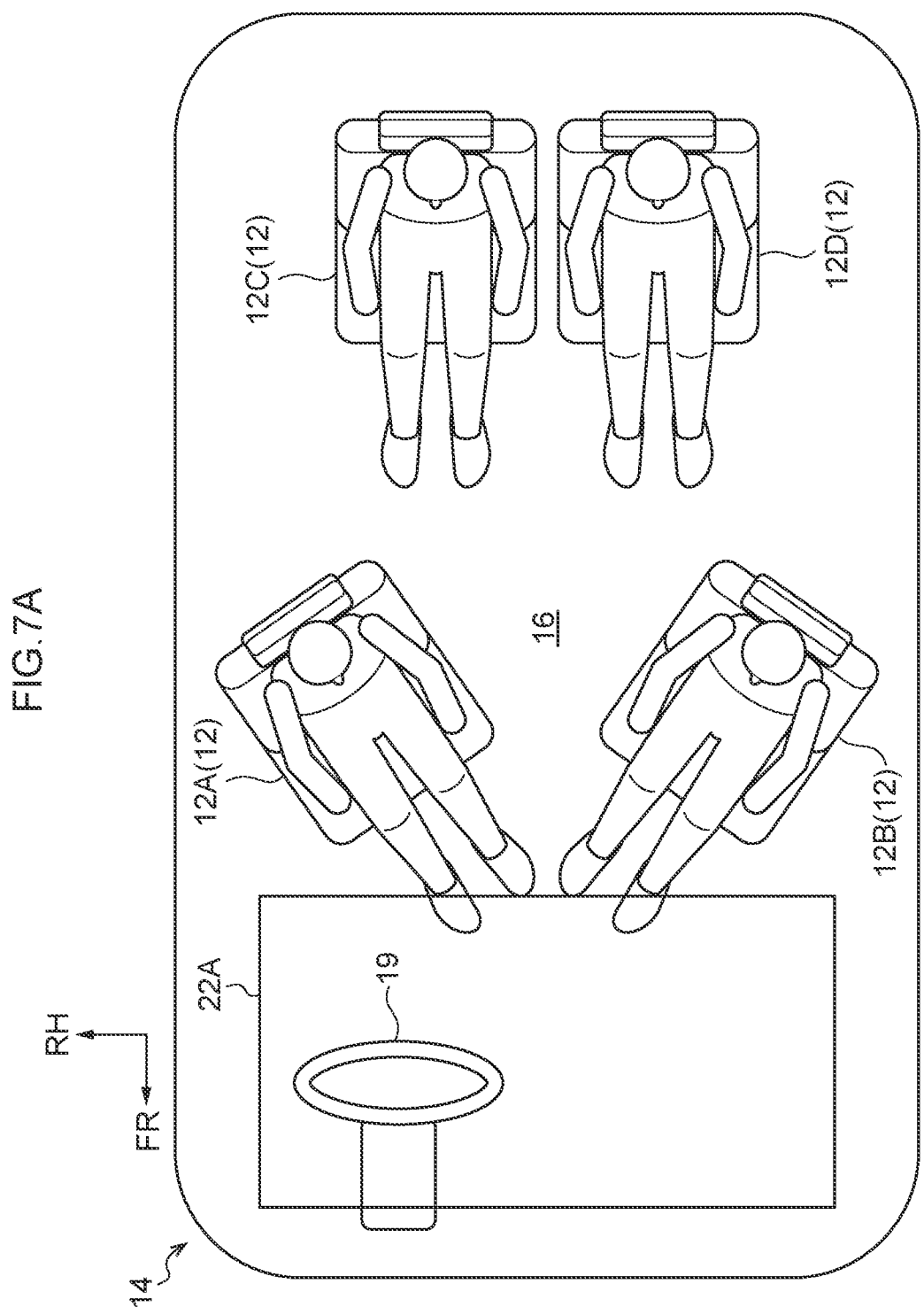

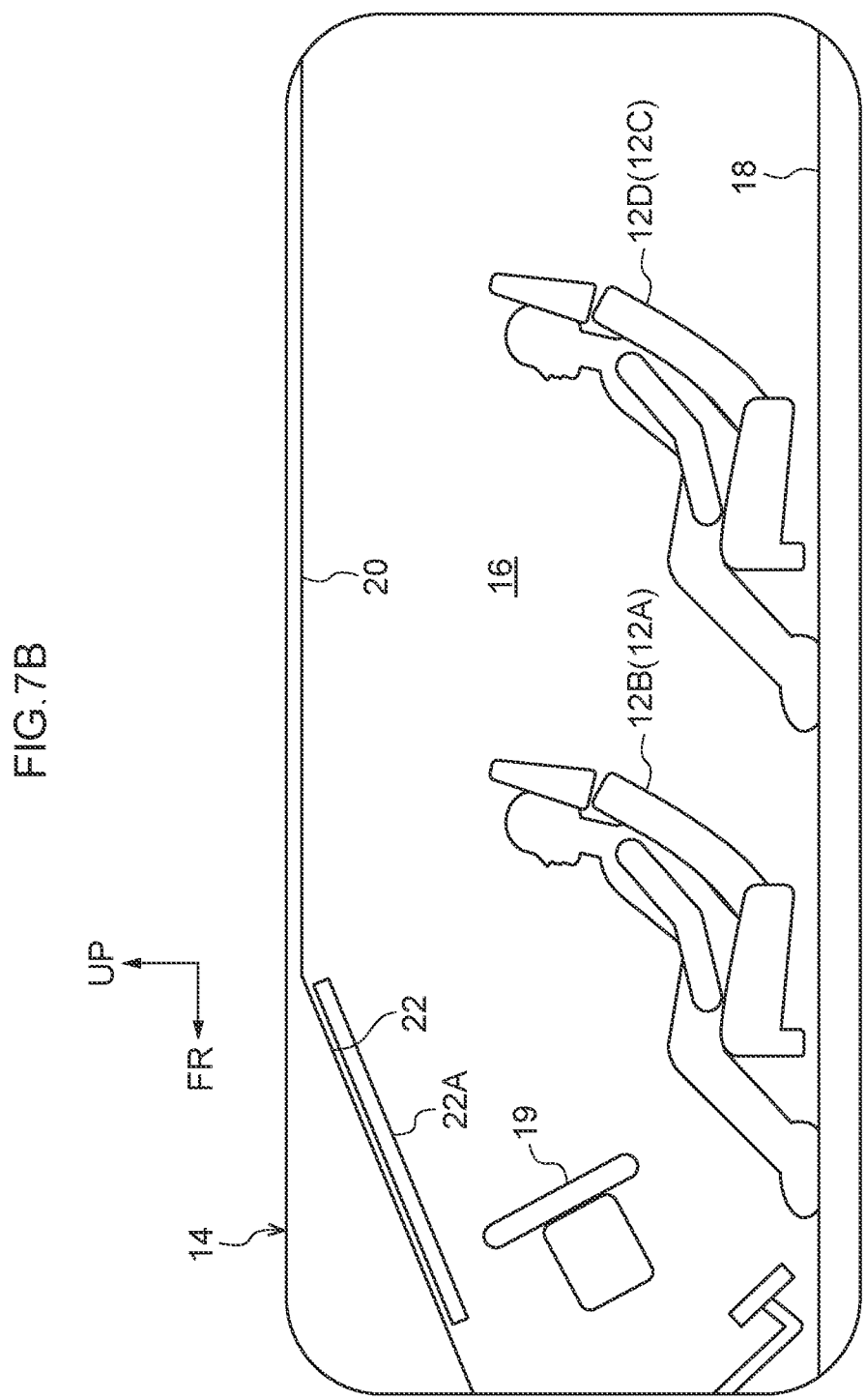

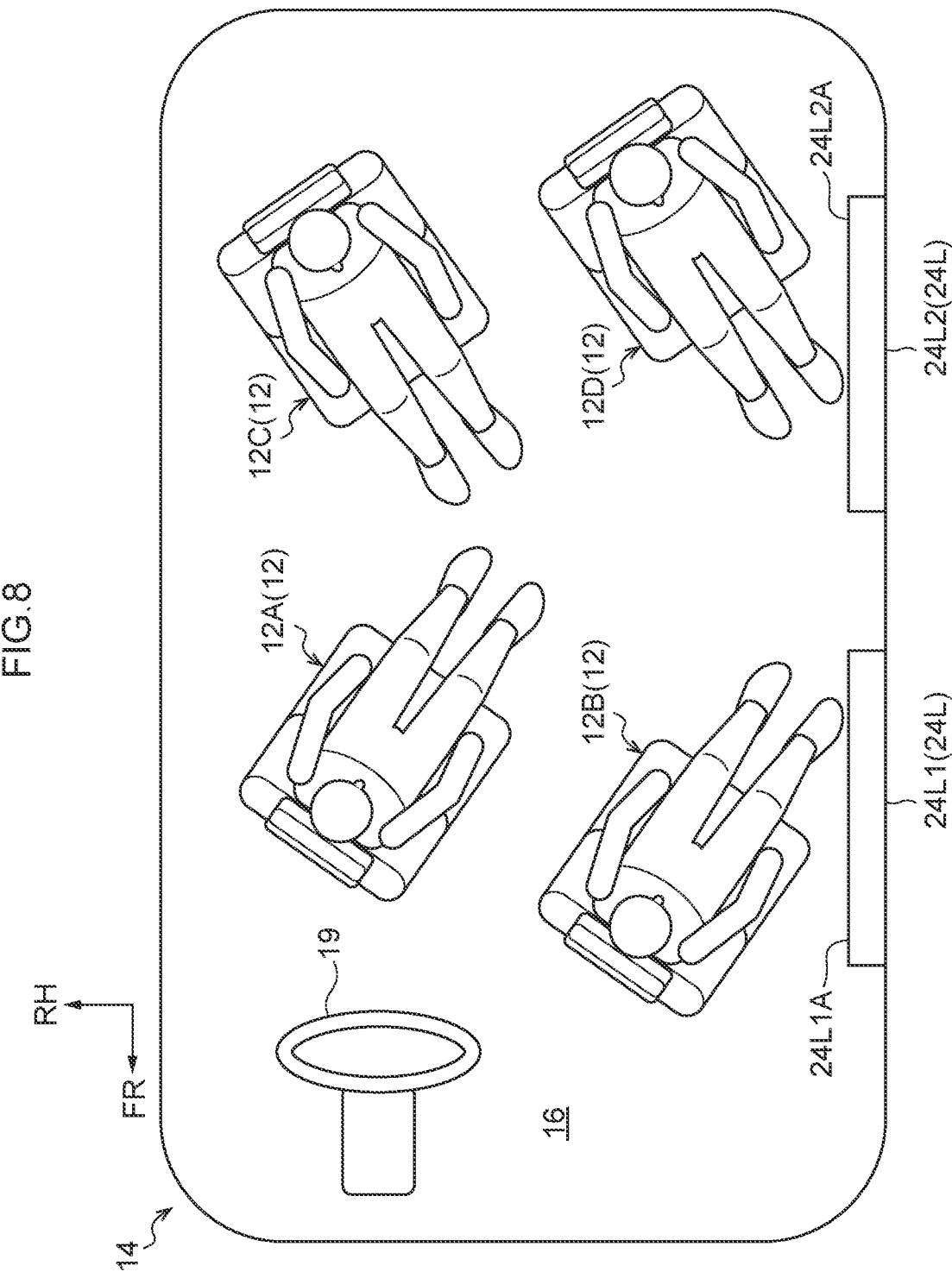

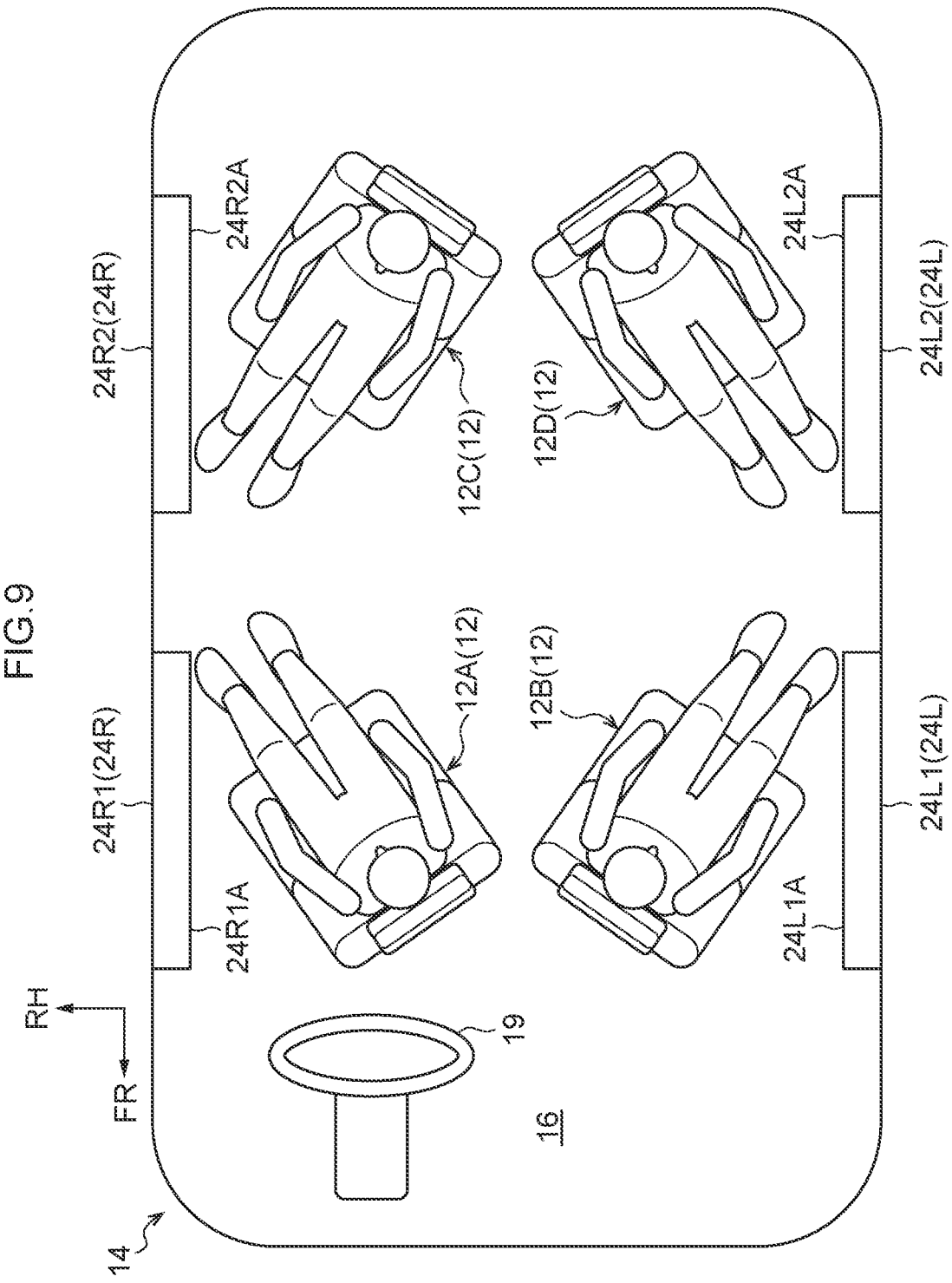

SEAT CONTROL DEVICE, SEAT CONTROL METHOD, NON-TRANSITORY RECORDING MEDIUM

CROSS-REFERENCE TO RELATED APPLICATION

This application is based on and claims priority under 35 USC 119 from Japanese Patent Application No. 2021-133605 filed on Aug. 18, 2021, the disclosure of which is incorporated by reference herein.

BACKGROUND

Technical Field

The present disclosure relates to a seat control device, a seat control method, and a non-transitory recording medium.

Related Art

For example, Japanese Patent Publication No. 6769407 describes a vehicle screen display device applied to a vehicle equipped with at least two vehicle seats rotatably attached to a vehicle body. The vehicle screen display device includes a display monitor, a detection means, and a control device. The display monitor includes a first display section that is rotatably attached to the vehicle body between the at least two vehicle seats and displays a first video on one face, and includes a second display section that displays a second video on the other face, this being either the same video or a different from the first video. The detection means detects a relative relationship between the respective facing-directions of the at least two vehicle seats and the facing-direction of the monitor. The control device controls the first display section and the second display section in accordance with the relative relationship as detected.

There is an anticipation that there will be an increase in opportunities to enjoy entertainment as autonomous driving becomes more widespread, such as by displaying a video on a video display area provided inside the vehicle, and by an occupant viewing the displayed video.

However, there is a need for the occupant to move a vehicle seat to a position where the displayed video is easy to view in cases in which there are plural video display areas provided inside the vehicle, and the video is displayed on one of the plural video display areas. In such a scenario the effort taken to move the vehicle seats becomes an issue.

SUMMARY

The present disclosure obtains a seat control device, a seat control method, and a seat control program that are capable of reducing the effort of occupants to move vehicle seats in cases in which a video is displayed on one of plural video display areas provided at a vehicle.

A seat control device according to a first aspect includes a first determination section, a second display section, and a modulation section. The first determination section is configured to select a video display area for displaying a video from among plural video display areas provided at a vehicle based on a selection by an occupant of the vehicle. The second determination section is configured to determine an adjustment amount corresponding to the video display area selected by the first determination section for a vehicle seat provided in the vehicle. The modulation section is configured to modulate a position and posture of the vehicle seat based on the adjustment amount of the vehicle seat as determined by the second determination section.

In the first aspect, the video display area for displaying a video is selected by the first determination section from among the plural video display areas provided at the vehicle based on the selection by the occupant, the adjustment amount corresponding to the determined video display area for the vehicle seat is determined by the second determination section, and the position and posture of the vehicle seat is modulated based on the adjustment amount of the vehicle seat as determined by the second determination section. The first aspect thereby enables a reduction in the effort of occupants to move vehicle seats in cases in which a video is displayed on one of plural video display areas provided at a vehicle.

A second aspect is the first aspect, wherein the second determination section includes a setting section, a posture detection section, and an adjustment section. The setting section is configured to determine a setting condition for the position and posture of each vehicle seat based on the video display area selected by the first determination section. The posture detection section is configured to detect the position and posture of each of the vehicle seats. The adjustment section is configured to determine an adjustment amount for each of the vehicle seats as a difference between the setting condition and a position and posture of the respective vehicle seats as detected by the posture detection section.

In the second determination section of the second aspect, the setting condition for the position and posture of each vehicle seat is determined by the setting section based on the video display area selected by the first determination section, the position and posture of each of the vehicle seats are detected by the posture detection section, and the adjustment amount for each of the vehicle seats is determined by the adjustment section based on the difference between the setting condition and the position and posture of the respective vehicle seats as detected by the posture detection section.

A third aspect is the first aspect or the second aspect, wherein the second determination section determines an adjustment amount that is at least one selected from the group consisting of a position of a vehicle seat along a vehicle front-rear direction, a position of a vehicle seat along a vehicle width direction, a rotation angle of a vehicle seat about a vertical direction axis, and a reclining angle of a seatback.

In the third aspect, the adjustment amount of the vehicle seat is able to be determined by the second determination section so as to make it easy for an occupant to view a video displayed on the video display area selected by the first determination section.

A fourth aspect is any one aspect of the first aspect to the third aspect, further including an occupant detection mechanism configured to detect a seated occupant seated in the vehicle seat, and wherein the second determination section determines the vehicle seat adjustment amount in accordance with the vehicle seats in which the occupants detected by the occupant detection mechanism is seated.

In the fourth aspect, due to the vehicle seats in which the occupants (i.e. the arrangement thereof) being detected from among the plural vehicle seats by the occupant detection mechanism is seated, this enables the vehicle seat adjustment amount for each of the vehicle seats to be determined in accordance with the vehicle seat arrangement. For example, even in cases in which the ceiling video display area is selected as the area for video display and the vehicle seats are to be reclined, the adjustment amount can be determined so as to recline only the vehicle seats in which the occupants is seated.

A fifth aspect is the fourth aspect, wherein the occupant detection mechanism detects a physique of the occupant seated in the vehicle seat, and the second determination section determines the vehicle seat adjustment amount in accordance with the physique of the occupant.

In the fifth aspect, the second determination section determines the vehicle seat adjustment amount in accordance with the physique of the occupant seated in the vehicle seat as detected by the occupant detection mechanism. For example, the adjustment amount can be set so as to raise the vehicle seat in cases of a low sitting height (eyepoint) of the seated occupant in the vehicle seat. This enables the position and posture of the vehicle seat, for example the height thereof, to be modulated in accordance with the physique of the seated occupant.

A sixth aspect is the fourth aspect or the fifth aspect, wherein the occupant detection mechanism includes an in-cabin camera configured to image an interior of a vehicle cabin of the vehicle, or a seat sensor configured to detect an occupant seated in the vehicle seat, or both the in-cabin camera and the seat sensor.

In the sixth aspect, the vehicle seats in which the occupants can be detected, and the physique (for example the sitting height (eyepoint)) of the seated occupant can be detected, based on a vehicle cabin interior video captured by the in-cabin camera. Moreover, vehicle seats in which the occupants can be detected by the seat sensors.

A seat control method according to a seventh aspect causes processing to be executed by a computer. The processing includes selecting a video display area for displaying a video from among plural video display areas provided at a vehicle, determining an adjustment amount corresponding to the selected video display area for a vehicle seat provided in the vehicle, and modulating a position and posture of the vehicle seat based on the determined vehicle seat adjustment amount.

The seat control method according to the seventh aspect, similarly to the first aspect, enables a reduction in the effort of occupants to move vehicle seats in cases in which a video is displayed on one of plural video display areas provided at a vehicle.

A seat control program according to an eighth aspect causes processing to be executed in a computer. The processing includes selecting a video display area for displaying a video from among plural video display areas provided at a vehicle, determining an adjustment amount corresponding to the selected video display area for a vehicle seat provided in the vehicle, and modulating a position and posture of the vehicle seat based on the determined vehicle seat adjustment amount.

The seat control program according to the eighth aspect, similarly to the first aspect, enables a reduction in the effort of occupants to move vehicle seats in cases in which a video is displayed on one of plural video display areas provided at a vehicle.

The present disclosure exhibits the effect of being able to reduce the effort of occupants to move vehicle seats in cases in which a video is displayed on one of plural video display areas provided at a vehicle.

BRIEF DESCRIPTION OF THE DRAWINGS

Exemplary embodiments of the present disclosure will be described in detail based on the following figures, wherein:

FIG. 2A is a diagram as viewed from above a vehicle schematically illustrating an arrangement of vehicle seats in a vehicle applied with a seat control device according to an exemplary embodiment;

FIG. 6B is a diagram as viewed from a vehicle side schematically illustrating an arrangement of vehicle seats in a vehicle applied with a seat control device according to an exemplary embodiment for a case in which a ceiling video display area has been selected;

FIG. 7A is a diagram as viewed from above a vehicle schematically illustrating an arrangement of vehicle seats in a vehicle applied with a seat control device according to an exemplary embodiment for a case in which a front windshield video display area has been selected;

FIG. 7B is a diagram as viewed from a vehicle side schematically illustrating an arrangement of vehicle seats in a vehicle applied with a seat control device according to an exemplary embodiment for a case in which a front windshield video display area has been selected;

FIG. 8 is a diagram as viewed from above a vehicle schematically illustrating an arrangement of vehicle seats in a vehicle applied with a seat control device according to an exemplary embodiment for a case in which side glass video display areas on one (the left) side have been selected;

FIG. 9 is a diagram as viewed from above a vehicle schematically illustrating an arrangement of vehicle seats in a vehicle applied with a seat control device according to an exemplary embodiment for a case in which side glass video display areas on both sides have been selected;

DETAILED DESCRIPTION

Figure 1:
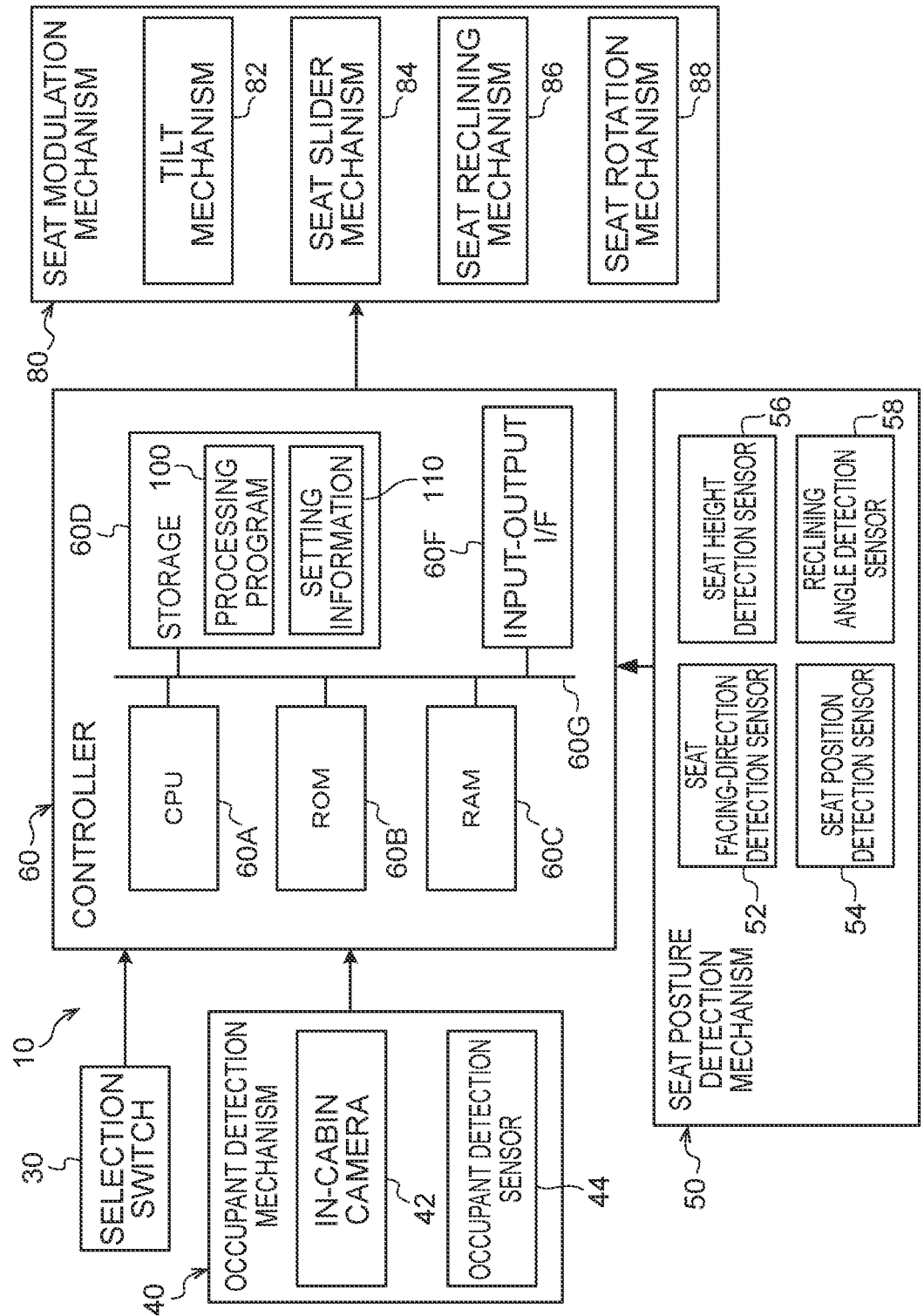
FIG. 1 is a diagram illustrating a schematic configuration of a seat control device.

Detailed explanation follows regarding an example of an exemplary embodiment of the present disclosure, with reference to the drawings. Note that the arrow FR, the arrow RH, and the arrow UP in the drawings respectively indicate a vehicle front direction, a vehicle right side, and a vehicle upward direction.

Exemplary Embodiment

Explanation follows regarding a seat control device according to an exemplary embodiment.

First explanation will be given regarding a vehicle 14 (see FIG. 2A and FIG. 2B) including an arrangement of plural vehicle seats 12 controlled by a seat control device 10 (see FIG. 1).

Figure 2B:
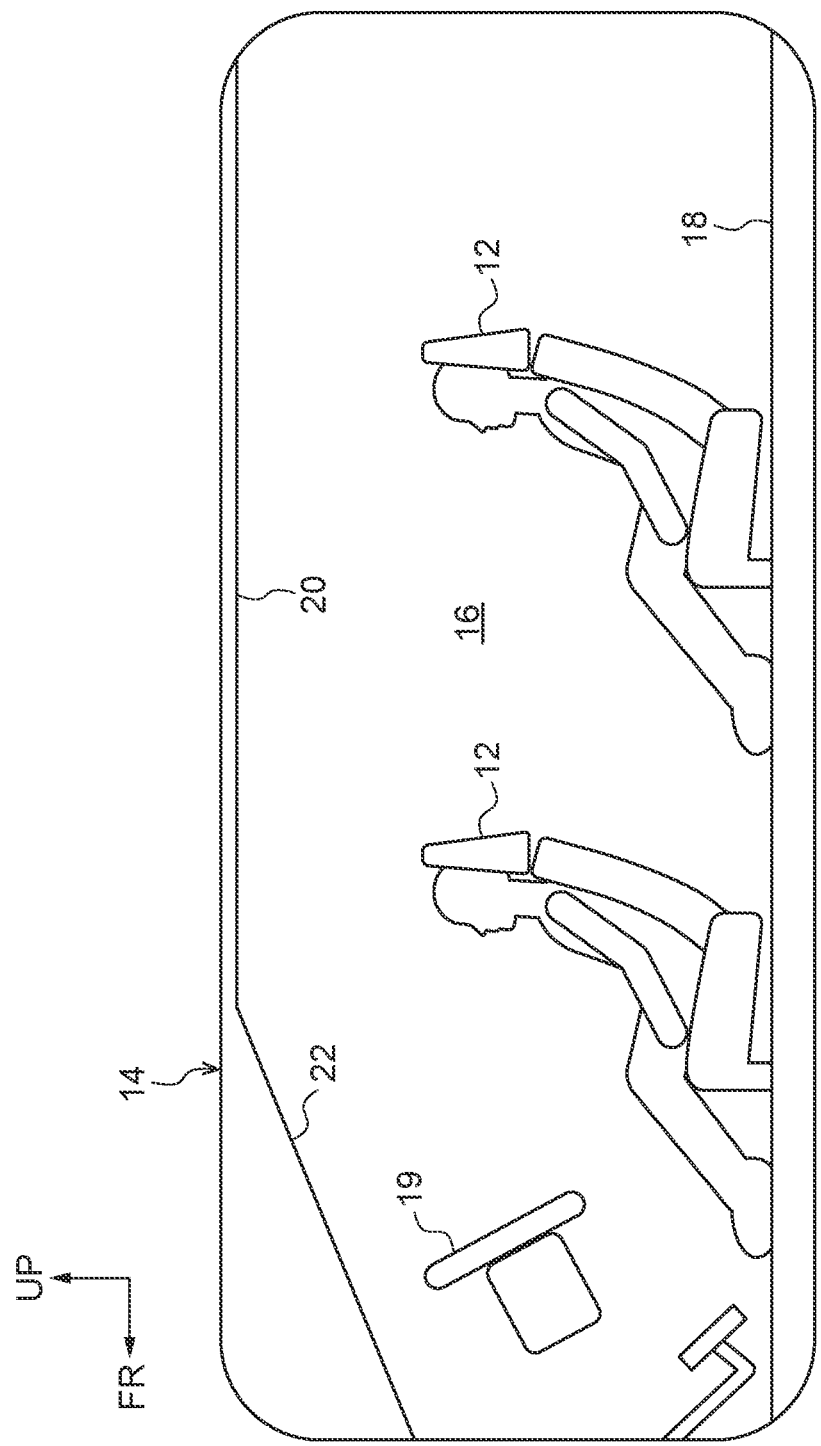
FIG. 2B is a diagram as viewed from a vehicle side schematically illustrating an arrangement of vehicle seats in a vehicle applied with a seat control device according to an exemplary embodiment.

The vehicle 14 is what is referred to as a one box car, such as schematically illustrated in FIG. 2A and FIG. 2B. The vehicle seats 12 are arranged on a floor 18 of a vehicle cabin 16 in the vehicle 14 as pairs across the vehicle width direction, so as to configure a two row front-rear arrangement. Note that the front right, front left, rear right, and rear left vehicle seats 12 will be respectively referred to as vehicle seats 12A to 12D when discriminating between the vehicle seats 12.

Note that each of the vehicle seats 12 is able to be modulated in height along the vehicle height direction using a tilt mechanism 82 (see FIG. 1), described later. The vehicle seats 12 are also able to be modulated in position both in the vehicle front-rear direction and the vehicle width direction using a seat slider mechanism 84 (see FIG. 1), described later. Furthermore, the vehicle seats 12 are able to be modulated in seatback reclining angle using a seat reclining mechanism 86 (see FIG. 1). Moreover, the vehicle seats 12 are able to be modulated in facing-direction of the vehicle seats 12 (rotation angle of the vehicle seat 12 about an axis along a vertical direction) using a seat rotation mechanism 88 (see FIG. 1), described later.

As illustrated in FIG. 2A and FIG. 2B, a steering wheel 19 is arranged in the vehicle cabin 16 at the vehicle front side of the front right vehicle seat 12A.

Moreover, as illustrated in FIG. 2B, a ceiling 20 is provided at the vehicle cabin 16, and a front windshield 22 is provided sloping diagonally downwards from a front edge of the ceiling 20 toward the vehicle front side.

Figure 6A:
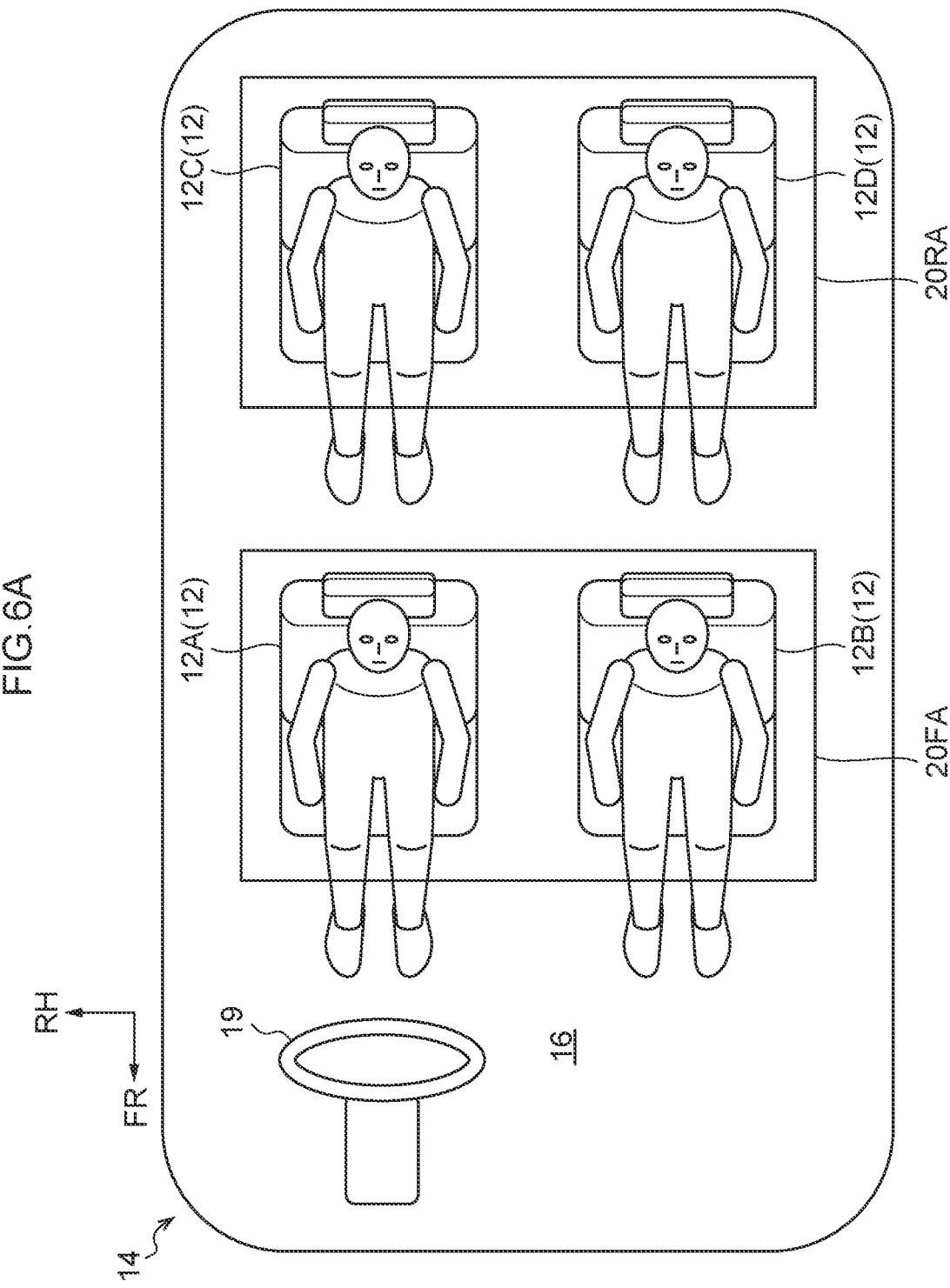
FIG. 6A is a diagram as viewed from above a vehicle schematically illustrating an arrangement of vehicle seats in a vehicle applied with a seat control device according to an exemplary embodiment for a case in which a ceiling video display area has been selected.

As illustrated in FIG. 6A and FIG. 6B, two video display areas 20FA and 20RA, split front and rear, are provided on the inside of the ceiling 20.

Moreover, as illustrated in FIG. 7A and FIG. 7B, a single video display area 22A is provided on the inside of the front windshield 22.

Furthermore, as illustrated in FIG. 9, two side glasses 24R1, 24R2 are provided at the right side of the vehicle cabin 16, split front and rear, and two side glasses 24L1, 24L2 are also provided at the left side of the vehicle cabin 16, split front and rear.

Note that there are respective video display areas 24R1A and 24R2A provided on the inside of the two panes of side glasses 24R1, 24R2 on the right side. Similarly, there are respective video display areas 24L1A and 24L2A provided on the inside of the two panes of side glasses 24L1, 24L2 on the left side.

Figure 10:
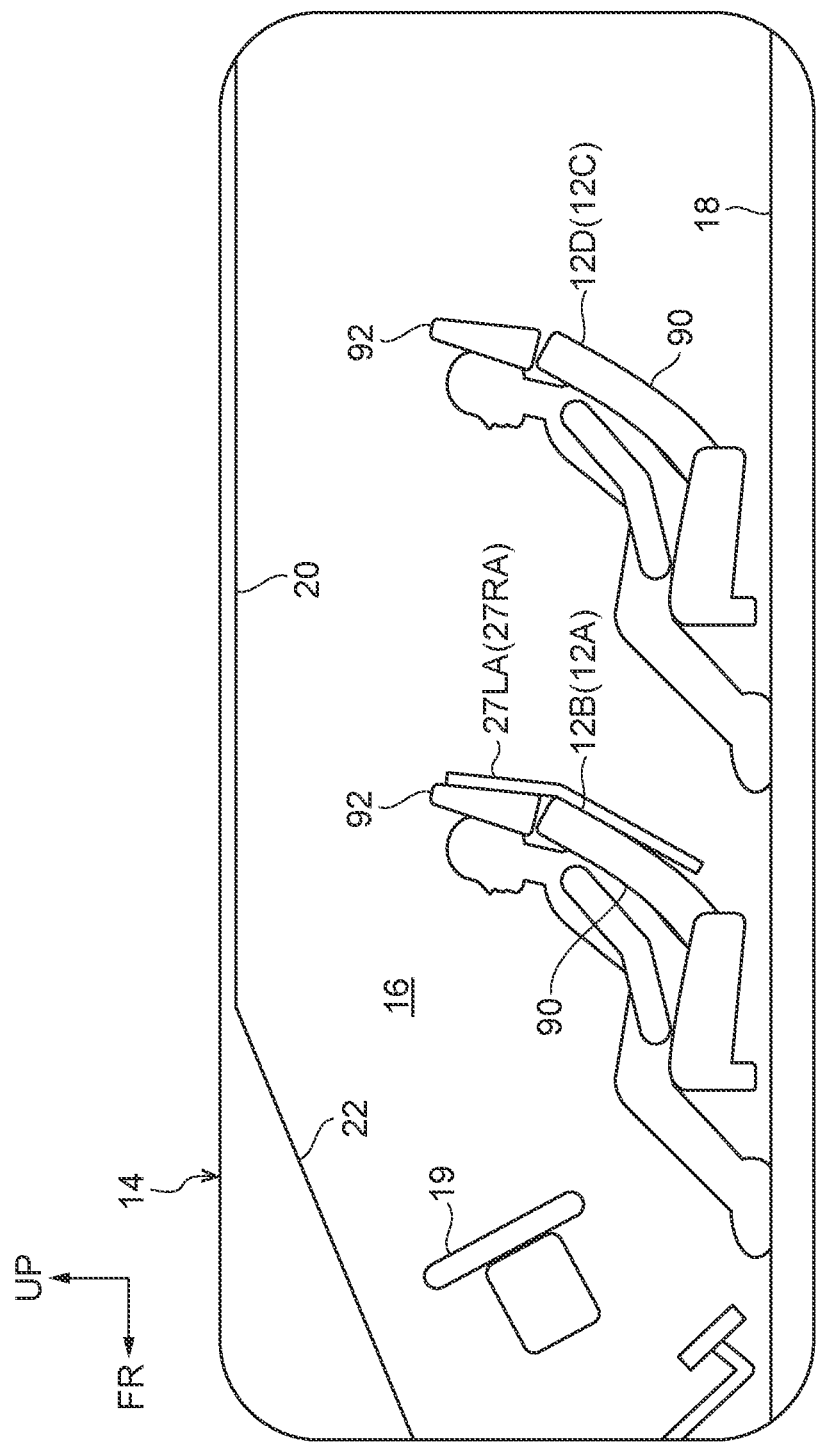
FIG. 10 is a diagram as viewed from a vehicle side schematically illustrating an arrangement of vehicle seats in a vehicle applied with a seat control device according to an exemplary embodiment for a case in which a vehicle seat video display area has been selected.

Moreover, as illustrated in FIG. 10, there are also video display areas 27RA, 27LA provided on the rear side of a seatback 90 and a headrest 92 of the front row vehicle seats 12 (12A, 12B).

These video display areas 20FA, 20RA, 22A, 24R1A, 24R2A, 24L1A, 24LA, 26A, 27RA, 27LA may be configured so as to display videos by projecting videos using a non-illustrated projector, and may be configured so as to display videos using an organic EL and the like provided in the relevant video display area. There is no particular limitation thereto and another known video display method may also be employed.

As illustrated in FIG. 1, the seat control device 10 includes a selection switch 30, an occupant detection mechanism 40, a seat posture detection mechanism 50, a controller 60, and a seat modulation mechanism 80. The seat modulation mechanism 80 corresponds to an "modulation section".

Figure 3:
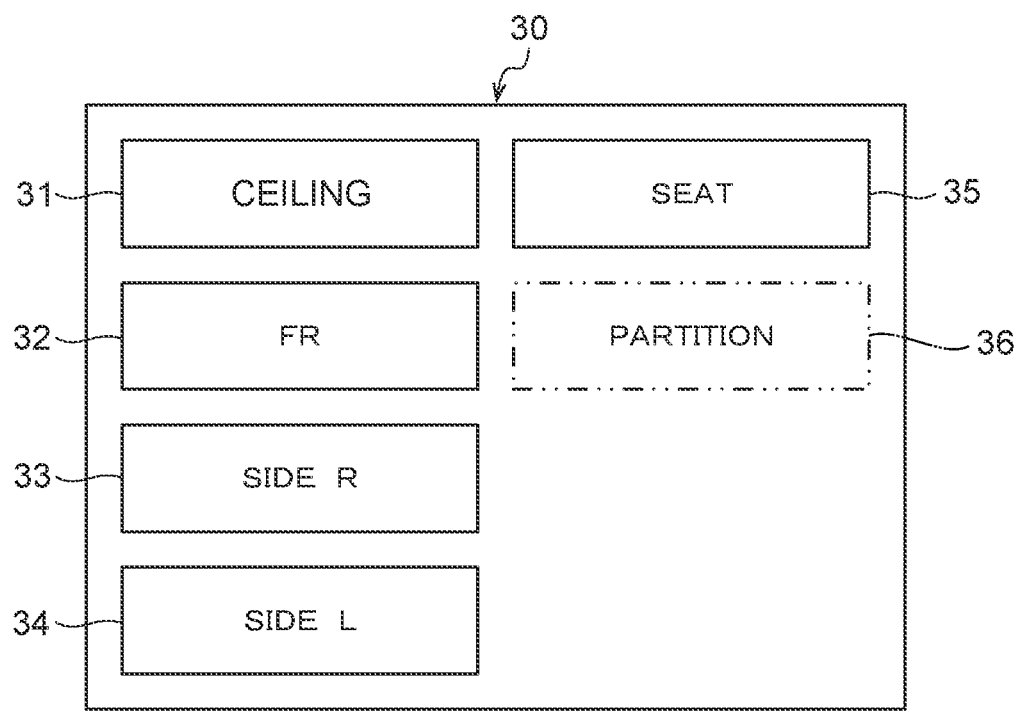
FIG. 3 is an explanatory diagram of a selection switch of a seat control device according to an exemplary embodiment.

The selection switch 30 is a switch provided in the vehicle cabin 16 at a vehicle sidewise direction of a driving seat (the front right vehicle seat 12A in the present exemplary embodiment). As illustrated in FIG. 3, the selection switch 30 for selecting video display area includes a CEILING switch 31 to indicate the ceiling, a FR switch 32 to indicate the front windshield 22, a SIDE R switch 33 to indicate the vehicle right side glass 24R, a SIDE L switch 34 to indicate the vehicle left side glass 24L, and a SEAT switch 35 to indicate the vehicle seat 12.

As illustrated in FIG. 1, the occupant detection mechanism 40 includes an in-cabin camera 42 provided in the vehicle cabin 16 and capable of imaging the vehicle interior (all of the vehicle seats 12 therein), and an occupant detection sensor 44 provided at each of the vehicle seats 12 to detected whether or not an occupant is seated in that vehicle seat 12. The occupant detection sensor 44 corresponds to a "seat sensor".

As illustrated in FIG. 1, the seat posture detection mechanism 50 includes, provided at each of the vehicle seats 12, a seat facing-direction detection sensor 52 to detect which direction the seat front side of each of the vehicle seats 12 is facing toward in plan view, a seat position detection sensor 54 to detect the position of each of the vehicle seats 12 in both the vehicle front-rear direction and the vehicle width direction, a seat height detection sensor 56 to detect a height of the vehicle seats 12, and a reclining angle detection sensor 58 to detect a reclining angle of a seatback of the vehicle seats 12.

As illustrated in FIG. 1, the controller 60 is configured including a central processing unit (CPU) 60A, read only memory (ROM) 60B, random access memory (RAM) 60C, storage 60D, and an input-output I/F 60F. The CPU 60A, the ROM 60B, the RAM 60C, the storage 60D, and the input-output I/F 60F are all connected together through an internal bus 60G so as to be able to communicate with each other.

The CPU 60A is a central processing unit and executes various programs and controls the other sections. Namely, the CPU 60A serving as a processor reads a program from the ROM 60B serving as memory or from the storage 60D serving as memory, and executes the program using the RAM 60C as workspace.

The ROM 60B is stored with various programs and various data.

The RAM 60C is temporarily stored as workspace with a program or data.

The storage 60D is configured by a hard disk drive (HDD) or solid state drive (SSD), and is stored with various programs and various data. A processing program 100 and setting information 110 are stored in the storage 60D of the present exemplary embodiment. The processing program 100 corresponds to a "seat control program".

The input-output I/F 60F is connected to the selection switch 30, the occupant detection mechanism 40, the seat posture detection mechanism 50, the seat modulation mechanism 80, and the like.

The processing program 100 serving as a seat control program is a program to control the controller 60. By executing the processing program 100 based on a selection signal input from the selection switch 30, the controller 60 transmits a drive signal to the seat modulation mechanism 80 based on setting conditions and the like, described later, and thereby drives the seat modulation mechanism 80 to modulate each of the vehicle seats 12 to a position and posture so as to enable seated occupants of the vehicle seats 12 to view a video on the selected video display area.

The setting information 110 holds setting conditions for each of the vehicle seats 12 for when each of the video display areas is selected by an occupant. Specifically, the setting conditions each include a facing-direction of the vehicle seat 12 in plan view (rotation angle of the vehicle seat 12 about an axis along a vertical direction), a position in the vehicle front-rear direction and in the vehicle width direction, a reclining angle, and the like.

Figure 4:
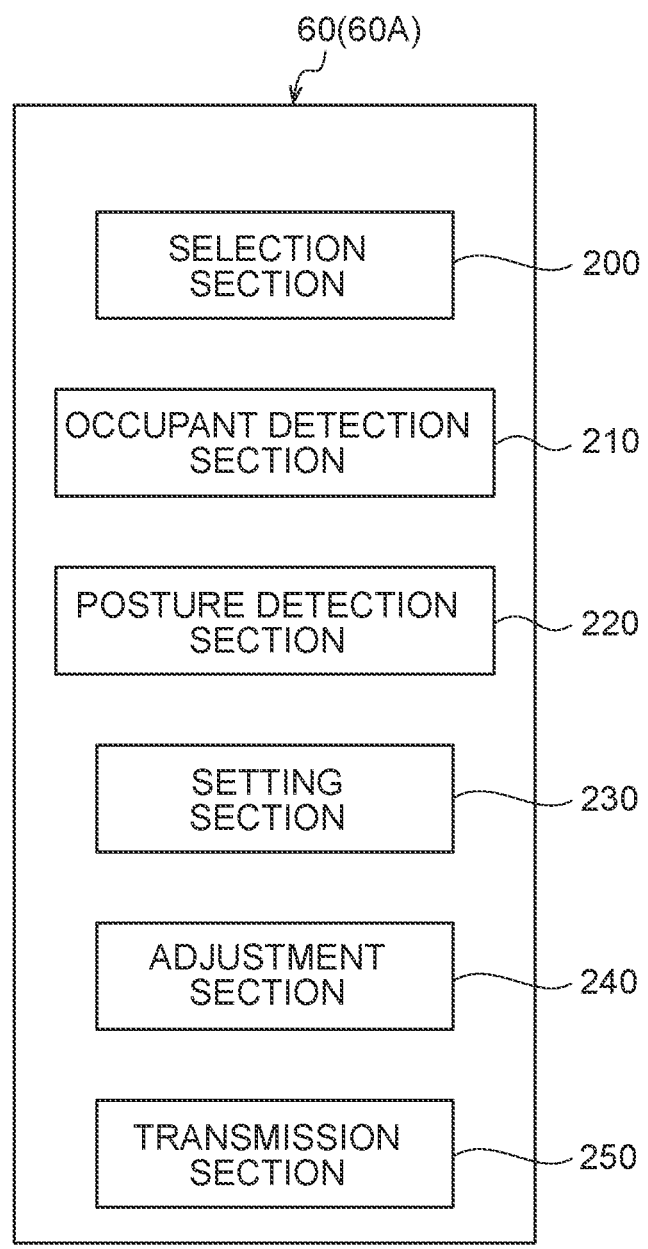
FIG. 4 is a block diagram illustrating a functional configuration of a controller of a seat control device according to an exemplary embodiment.

As illustrated in FIG. 4, in the controller 60 of the present exemplary embodiment, by executing the processing program 100 the CPU 60A functions as a selection section 200, an occupant detection section 210, a posture detection section 220, a setting section 230, an adjustment section 240, and a transmission section 250. The selection section 200 corresponds to a "first determination section". The posture detection section 220, the setting section 230, and the adjustment section 240 correspond to a "second determination section".

The selection section 200 is input with a selection signal from the selection switch 30 under operation of the selection switch 30 by an occupant, and includes a function to select the video display area on which to display a video based on the selection signal. For example, in cases in which the CEILING switch 31 has been operated, the selection section 200 selects that the area for video display is the video display areas 20FA, 20RA provided on the ceiling 20 (see FIG. 6A and FIG. 6B).

Similarly, in cases in which the SIDE L switch 34 has been operated, the selection section 200 selects that the area for video display is the video display areas 24L1A, 24L2A provided on the left side glasses 24L1, 24L2 (see FIG. 9). In cases in which the SIDE R switch 33 has been operated, the selection section 200 similarly selects that the area for video display is the video display areas 24R1A, 24R2A provided on the right side glasses 24R1, 24R2 (see FIG. 9).

Moreover, in cases in which both the SIDE R switch 33 and the SIDE L switch 34 have been operated at the same time, the selection section 200 selects that the area for video display is the video display areas 24R1A, 24R2A provided on the right side glasses 24R1, 24R2 and the video display areas 24L1A, 24L2A provided on the left side glasses 24L1, 24L2.

The occupant detection section 210 includes a function to detect a seated state of each of the vehicle seats 12 (whether or not an occupant is seated therein) based on an output signal from the occupant detection mechanism 40.

Namely, whether or not an occupant is seated in the vehicle seat 12 is determined such as from images captured by the in-cabin camera 42 of the vehicle cabin 16, and vehicle seats 12 in which the occupants are detected therefrom. Alternatively, the vehicle seats 12 in which the occupants may be detected based on an output signal of the occupant detection sensor 44 provided at each of the vehicle seats 12.

The posture detection section 220 includes a function to detect a posture (state amounts) of the vehicle seat 12 based on an output signal from the seat posture detection mechanism 50. For example, a direction (facing-direction) of each of the vehicle seats 12 in plan view is detected from an output signal of the seat facing-direction detection sensor 52. Moreover, the position of each of the vehicle seats 12 in the vehicle front-rear direction and in the vehicle width direction is detected from an output signal of the seat position detection sensor 54. Furthermore, the height direction height of each of the vehicle seats 12 is detected from an output signal of the seat height detection sensor 56. Furthermore, the reclining angle of each of the vehicle seats 12 is detected from an output signal of the reclining angle detection sensor 58.

Note that reference to the "posture" of the vehicle seat 12 in the present specification not only includes the facing-direction, height, and reclining angle of the vehicle seat 12, but also sometimes includes the position thereof in the vehicle front-rear direction and in the vehicle width direction.

The setting section 230 includes a function to read setting conditions of the vehicle seats 12 from the setting information 110 pre-stored in the storage 60D in accordance with the video display area selected by the selection section 200 and the seated state of the vehicle seats 12 detected by the occupant detection section 210.

For example, in cases in which the selected video display area is the ceiling 20, the front row vehicle seats 12A, 12B are set so as to be positioned in the vehicle front-rear direction directly below the video display area 20FA, and the rear row vehicle seats 12C, 12D are set so as to be positioned in the vehicle front-rear direction directly below the video display area 20RA. Moreover, setting conditions are set for large reclining angles of the vehicle seats 12A to 12D such that the faces of the seated occupants face toward the video display areas 20FA, 20RA on the ceiling.

The adjustment section 240 includes a function to compute an adjustment amount that is a difference between the setting conditions for the vehicle seats 12 and the postures (state amounts) of each of the vehicle seats 12 as detected by the posture detection section 220, and a function to generate a drive signal for the seat modulation mechanism 80 based on these adjustment amounts. For example, in cases in which the selected video display area is the ceiling 20, a movement amount (adjustment amount) in the vehicle front-rear direction is computed for the front right vehicle seat 12A based on the difference between the current position in the vehicle front-rear direction of the vehicle seat 12A and the position in the vehicle front-rear direction as set by the setting conditions, and a drive signal is generated based on this movement amount.

The transmission section 250 includes a function to transmit the drive signal generated in the adjustment section 240 to the seat modulation mechanism 80 (the tilt mechanism 82, the seat slider mechanism 84, the seat reclining mechanism 86, and the seat rotation mechanism 88) through the input-output I/F 60F.

The seat modulation mechanism 80 includes the tilt mechanism 82, the seat slider mechanism 84, the seat reclining mechanism 86, and the seat rotation mechanism 88. Each mechanism is provided at each of the vehicle seats 12.

The tilt mechanism 82 is a mechanism for displacing the vehicle seat 12 in the height direction based on the drive signal for the controller 60. This is done to modulate the height of the vehicle seat 12 in accordance with the physique (sitting height/eyepoint position) and the like of the occupant so as to enable the occupant to view the video in a relaxed manner.

The seat slider mechanism 84 is configured so as to be able to displace the vehicle seats 12 in the vehicle front-rear direction and in the vehicle width direction based on the drive signal for the controller 60. The vehicle seats 12 are thereby moveable so as to be directly opposite the selected video display area. Moreover as illustrated in FIG. 7A, for example, all of the seated occupants in the vehicle seats 12 are able to view the video comfortably by moving the front row vehicle seats 12A, 12B, which are nearer to the video display area 22A, toward the vehicle width direction outside, and moving the rear row vehicle seats 12C. 12D toward the vehicle width direction inside.

The seat reclining mechanism 86 is a mechanism to change the tilt angle (reclining angle) of the seatback with respect to the seat cushion in the vehicle seats 12 based on a drive signal output from the controller 60. For example, the reclining angle is made large in cases in which the video for viewing is displayed on the ceiling 20 (the video display areas 20FA, 20RA), and the reclining angle is made small in cases in which the video for viewing is displayed on the front windshield 22 (the video display area 22A). Adopting this approach enables the seated occupant to view the video in a relaxed posture in both cases.

The seat rotation mechanism 88 is a mechanism capable of rotating the vehicle seats 12 about rotation axes extending along the vertical direction, so as to modulate the facing-direction (rotation angle) of the vehicle seat 12 based on the drive signal from the controller 60. For example, the vehicle seats 12 that are facing toward the vehicle front are rotated by 30° toward the vehicle width direction outsides (see FIG. 13).

Operation

Figure 5:
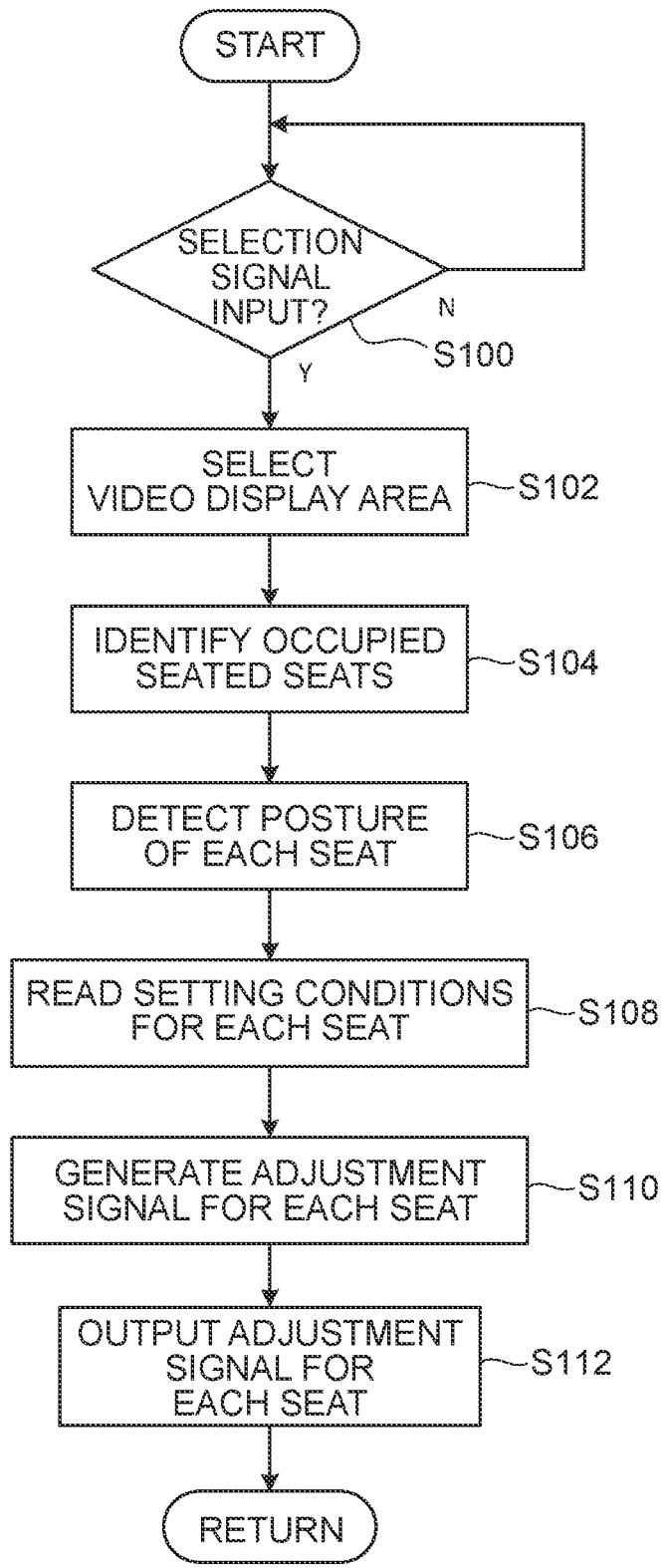
FIG. 5 is a flowchart illustrating vehicle seat control according to an exemplary embodiment.

Explanation follows, with reference to the flowchart in FIG. 5, regarding a flow of vehicle seat control processing executed by the controller 60 in the present exemplary embodiment by an occupant selecting a video display area with the selection switch 30. Execution of this processing causes the CPU 60A of the controller 60 to function either at a specific timing or periodically as the selection section 200, the occupant detection section 210, the posture detection section 220, the setting section 230, the adjustment section 240, and the transmission section 250.

First, the present control is executed by the controller 60 upon detecting that the vehicle 14 has transitioned to autonomous driving (fully autonomous driving), and by the CPU 60A reading the processing program 100 from the storage 60D and executing the processing program 100.

The CPU 60A determines whether or not a selection signal has been input from the selection switch 30 (step S100 in FIG. 5 ("FIG. 5" will be omitted hereafter)). In cases in which there is no signal input (step S100: NO), the CPU 60A stands by until a selection signal is input.

However, when a selection signal has been input, the CPU 60A selects the video display area based on the selection signal (step S102).

For example, when a ceiling selection signal is input to the controller 60 due to the occupant pressing the CEILING switch 31 on the selection switch 30, the CPU 60A selects that the video display areas 20FA, 20RA on the ceiling 20 are the area for video display.

Next the CPU 60A identifies the vehicle seats 12 (the vehicle seats 12A to 12D) in which the occupants is seated based on an image captured by the in-cabin camera 42 for imaging the vehicle cabin 16 interior, or based on an output signal of the occupant detection sensors 44 (step S104). Say, for example, occupants are detected as being seated in all of the vehicle seats 12 (see FIG. 2A).

The CPU 60A then acquires posture information about the vehicle seats 12 from signals output from the seat facing-direction detection sensor 52, the seat position detection sensor 54, the seat height detection sensor 56, and the reclining angle detection sensor 58 provided at each of the vehicle seats 12 (step S106). Namely, the facing-direction of each of the vehicle seats 12, the position of each of the vehicle seats 12 in the vehicle front-rear direction and in the vehicle width direction, the height of each of the vehicle seats 12, and the reclining angle of each of the vehicle seats 12 are detected.

Furthermore, based on the selected video display area, the CPU 60A reads the setting conditions for the vehicle seats 12 as stored in the setting information 110 of the storage 60D (step S108). For example, in cases in which the selected video display area is the ceiling, the read setting conditions are: position the front row vehicle seats 12A, 12B directly below the video display area 20FA; position the rear row vehicle seats 12C, 12D directly below the video display area 20RA; and make the reclining angle a large angle for all of the vehicle seats 12.

The CPU 60A then computes an adjustment amount for each of the vehicle seats 12, which is a difference between the setting conditions of each of the vehicle seats 12 and the current posture (state amounts) of each of the vehicle seats 12, and then generates a drive signal for each of the vehicle seats 12 based on these adjustment amounts (step S110). For example, drive signals are generated to move each of the vehicle seats 12 by a specific amount toward the vehicle rear, and to increase the reclining angle to a specific angle.

The CPU 60A then transmits the generated drive signals to each of the mechanisms of the seat modulation mechanism 80 through the input-output I/F 60F (step S112).

Thereby, as illustrated in FIG. 6A and FIG. 6B, the seat slider mechanism 84 is driven to move the vehicle seats 12 toward the vehicle rear side, positioning the front row vehicle seats 12A, 12B directly below the video display area 20FA and positioning the rear row vehicle seats 12C, 12D directly below the video display area 20RA. Moreover, adopting a large reclining angle in each of the vehicle seats 12 means that the faces of the seated occupants in each of the vehicle seats are facing toward the video display areas 20FA, 20RA.

This cycle of processing is repeated until fully autonomous driving is ended.

Note that in the present exemplary embodiment, the modulation (control) of the posture of the vehicle seats 12 is not changed between cases in which there are seated occupants in all of the vehicle seats 12 and cases in which there are seated occupants only in some of the vehicle seats 12 (cases in which some seats are empty).

Effects

Thus without the seated occupants needing to modulate the posture (position and reclining angle) of the vehicle seats 12 in accordance with the selected video display areas 20FA, 20RA, the posture of the vehicle seats 12 are automatically modulated to an appropriate state for viewing by the seated occupants, saving the occupants the effort to modulate the vehicle seats 12.

Moreover, in cases in which modulation of the vehicle seat 12 is performed manually, there is a need to modulate each of the vehicle seats 12 in such a manner that the front row vehicle seats 12A, 12B set with a large reclining angle do not interfere with the seated occupants of the rear row vehicle seats 12C. 12D. This accordingly entails the seated occupants of each of the vehicle seats 12 needing to modulate while checking the posture etc. of the other vehicle seats 12, making modulation troublesome. However, in the case of the present exemplary embodiment, setting conditions such that the interference described above does not occur are pre-stored in the setting information 110, saving the occupants the effort for modulating the vehicle seats 12.

Furthermore, in the present exemplary embodiment, the modulation (control) of the posture of the vehicle seats 12 is not changed between cases in which there are seated occupants on all of the vehicle seats 12, and cases in which there are seated occupants only on some of the vehicle seats 12 (cases in which some seats are empty), and so control is simplified.

Note that although in the processing described above the selected video display area was the ceiling 20, similar control is performed for cases in which another of the video display areas is selected. A brief explanation now follows regarding the effects from control for each of the selection cases.

FR Switch 32 Selected

Namely, in cases in which the FR switch 32 has been selected by the occupant with the selection switch, similarly to as described above, the CPU 60A selects that the video display area 22A of the front windshield 22 is the area for video display (step S102). Moreover, the CPU 60A reads the setting conditions corresponding to the selected video display area from the setting information 110. Furthermore, the CPU 60A computes the adjustment amount that is the difference between the setting conditions and the posture of each of the vehicle seats, and outputs a drive signal generated in accordance with the adjustment amount to the seat modulation mechanism 80.

The seat slider mechanism 84 and the seat rotation mechanism 88 are driven by this drive signal and, as illustrated in FIG. 7A, the front row vehicle seats 12A, 12B are respectively moved to the two vehicle width direction edges (both sides), and each of the vehicle seats 12A, 12B is respectively rotated from the vehicle forward direction to face toward the vehicle width direction inside in plan view so as to face directly toward the video display area 22A. The rear row vehicle seats 12C, 12D are moreover moved toward the vehicle width direction center. Moreover, a large reclining angle is set for all of the vehicle seats 12.

Effects

Thus in this manner, the front row vehicle seats 12A, 12B are moved to the edge at the two vehicle width direction sides and the rear row vehicle seats 12C, 12D are also moved, such that the seated occupants of the rear row vehicle seats 12C, 12D do not find the front row vehicle seats 12A, 12B nor the seated occupants therein to be in the way, enabling videos displayed on the front windshield 22 (the video display area 22A thereof) to be viewed with certainty (see FIG. 7A and FIG. 7B). Namely, there is no need for the seated occupants to cooperate with each other in modulating the postures of the vehicle seats 12 in order for all of the seated occupants of the vehicle seats 12 to be able to view the video displayed on the video display area 22A, eliminating the troublesomeness of modulation.

Moreover, the vehicle seats 12A, 12B that have been moved to the two vehicle width direction edges are respectively angled from the vehicle forward direction so as to face in directions toward the vehicle width direction center in plan view, such that the seated occupants are facing toward the front windshield 22 (the video display area 22A thereof), and enabling certainty in viewing from the two vehicle width direction edges. Furthermore, due to each of the vehicle seats 12 being reclined, the seated occupants are able to view in a relaxed posture.

SIDE L Switch 34 Selected

In cases in which the SIDE L switch 34 has been selected by the occupant with the selection switch, similarly to as described above and as illustrated in FIG. 8, the CPU 60A selects that the video display areas 24L1A, 24L2A of the side glasses 24L1, 24L2 are the area for video display (step S102). Moreover, the CPU 60A reads the setting conditions corresponding to the selected video display areas 24L1A, 24L2A from the setting information 110. Furthermore, the CPU 60A computes the adjustment amount that is the difference between the setting conditions and the posture of each of the vehicle seats, and outputs a drive signal generated in accordance with the adjustment amount to the seat modulation mechanism 80.

The seat slider mechanism 84 and the seat rotation mechanism 88 are driven by this drive signal, and as illustrated in FIG. 8, the front row vehicle seats 12A, 12B are angled from the vehicle rearward direction so as to face toward the vehicle width direction left side in plan view, and the rear row vehicle seats 12C, 12D are angled from the vehicle forward direction so as to face toward the vehicle width direction left side in plan view.

Note that the position of each of the vehicle seats 12 may be modulated such that the front row right vehicle seat 12A is positioned more toward the vehicle rear side than the front row left vehicle seat 12B, and such that the rear row right vehicle seat 12C is positioned more toward the vehicle front side than the rear row left vehicle seat 12D.

Moreover, all of the vehicle seat 12 are set with a large reclining angle.

However, in such cases the video is displayed while utilizing the two video display areas 24LA, 24L2A as a single screen.

Effects

Due to the front row vehicle seats 12A, 12B facing from the vehicle rearward direction toward the vehicle width direction left side in plan view, and due to the rear row vehicle seats 12C. 12D facing from the vehicle forward direction toward the vehicle width direction left side in plan view, the seated occupants in all of the vehicle seats 12 face toward the video display areas 24L1A, 24L2A positioned on the left side of the vehicle 14, making it easy to view the video displayed on the video display areas 24L1A, 24L2A.

Moreover, due to the front row right vehicle seat 12A being positioned more to the vehicle rear side than the front row left vehicle seat 12B, and due to the rear row right vehicle seat 12C being positioned more to the vehicle front side than the rear row left vehicle seat 12D, the seated occupants in the vehicle seats 12A, 12C on the right do not find the vehicle seats 12B. 12D on the left nor the seated occupants thereof to be in the way, enabling the video displayed on the left side glasses 24L1, 24L2 (the video display areas 24L1A, 24L2A thereof) to be viewed with certainty. Moreover, the seated occupants are able to view in a relaxed posture due to each of the vehicle seat 12 being reclined.

Note that cases in which the SIDE R switch 33 has been selected are left-right symmetrical to cases in which the SIDE L switch 34 has been selected, and so similar explanation will be omitted thereof.

SIDE L Switch 34 and SIDE R Switch 33 Selected at Same Time

In cases in which the SIDE L switch 34 and the SIDE R switch 33 are selected at the same time by an occupant with the selection switch 30, similarly to as described above and as illustrated in FIG. 9, the CPU 60A selects that the video display areas 24R1A, 24R2A of the side glasses 24R1, 24R2 and the video display areas 24L1A, 24L2A of the side glasses 24L1, 24L2 are the areas for video display (step S102). Moreover, the CPU 60A reads the setting conditions corresponding to the selected video display areas 24R1A, 24R2A, 24L1A, 24L2A from the setting information 110. Furthermore, the CPU 60A computes an adjustment amount, which is a difference between the setting conditions and the current posture of each of the vehicle seats 12, and outputs the drive signal generated in accordance with the adjustment amount to the seat modulation mechanism 80.

The seat slider mechanism 84 and the seat rotation mechanism 88 are driven by this drive signal, and as illustrated in FIG. 9, the front row vehicle seats 12A, 12B are moved toward the vehicle front side, and the rear row vehicle seats 12C, 12D are moved toward the vehicle rear side. The front row vehicle seats 12A, 12B and the rear row vehicle seats 12C, 12D are thereby separated from each other.

Moreover, as illustrated in FIG. 9, the front row right vehicle seat 12A is made to face from the vehicle rearward direction toward the vehicle width direction right side in plan view, and the rear row right vehicle seat 12C is made to face from the vehicle forward direction toward the vehicle width direction right side in plan view. Moreover, as illustrated in FIG. 9, the front row left vehicle seat 12B is made to face from the vehicle rearward direction toward the vehicle width direction left in plan view, and the rear row left vehicle seat 12D is made to face from the vehicle forward direction toward the vehicle width direction outside left in plan view. Namely, the right side vehicle seats 12A, 12C are made to face toward the video display areas 24R1A, 24R2A of the right side glasses 24R1, 24R2, and the left side vehicle seats 12B, 12D are made to face toward the video display areas 24L1A, 24L2A of the left side glasses 24L1, 24L2. All of the vehicle seats 12 are also set with a large reclining angle.

However, in such cases, the respective videos are displayed with the two video display areas 24R1A, 24R2A acting as a single screen, and with the two video display areas 24L1A, 24L2A acting as a single screen.

Effects

Due to the right side vehicle seats 12A, 12C facing toward the video display areas 24R1A, 24R2A of the right side glasses 24R1, 24R2, and the left side vehicle seats 12B, 12D facing toward the video display areas 24L1A, 24L2A of the left side glasses 24L1, 24L2 in this manner, the faces of the seated occupants in each of the vehicle seats 12 face toward the video display areas 24R1A, 24R2A or the video display areas 24L1A, 24L2A, making viewing easy. Moreover, the seated occupants are able to view in a relaxed posture due to each of the vehicle seats 12 being reclined.

SEAT Switch 35 Selected

In cases in which the SEAT switch 35 has been selected by the occupant with the selection switch, similarly to as described above, the CPU 60A selects that the video display areas 27RA, 27LA (see FIG. 10) set on the vehicle seats 12A, 12B from the rear side of the seatback 90 to the rear side of the headrest 92, and excluding the vehicle seats in the final row (the vehicle seats 12C, 12D in the present exemplary embodiment), are the area for video display (step S102). Moreover, the CPU 60A reads the setting conditions corresponding to the selected video display areas 27RA, 27LA from the setting information 110. Moreover, the CPU 60A computes the adjustment amount, which is a difference between the setting conditions and the current posture of each of the vehicle seats 12, and outputs a generated drive signal in accordance with the adjustment amount to the seat modulation mechanism 80.

The seat reclining mechanism 86 is driven by the drive signal, and as illustrated in FIG. 10, the reclining angle is modulated for the vehicle seats 12A, 12B and the vehicle seats 12C. 12D such that the video display areas 27RA, 27LA of the front row vehicle seats 12A, 12B are easily viewed by the seated occupants of the rear row vehicle seats 12C, 12D.

Moreover, the seat slider mechanism 84 is driven such that the vehicle front-rear direction distance between the front row vehicle seats 12A, 12B and the rear row vehicle seats 12C, 12D is a specific distance.

Effects

The reclining angle of the front row vehicle seats 12A, 12B is modulated in this manner, such that the video display areas 27RA, 27LA set on the seatback 90 and headrest 92 of each of the vehicle seats 12A, 12B are easily viewed by seated occupants of the rear row vehicle seats 12C, 12D.

Due to the vehicle front-rear direction distance between the front row vehicle seats 12A, 12B and the rear row vehicle seats 12C, 12D being at the specific distance, the video display areas 27RA, 27LA are easily viewed by seated occupants of the rear row vehicle seats 12C, 12D.

Namely, the vehicle seats 12 are automatically modulated to an easily viewed posture without each of the seated occupants of the rear row vehicle seats 12C. 12D modulating the posture of each of the vehicle seats 12A, 12B.

Variations

Explanation follows regarding variations of the present exemplary embodiment. Each of the variations is a configuration substantially similar to the exemplary embodiment described above, and the same reference numerals are appended to similar configuration elements to those of the exemplary embodiment described above, or the drawings employed to explain the exemplary embodiment described above will be used for reference, and detailed explanation thereof will be omitted. Note that each of the variations will be explained with a focus on the portions thereof that differ from the exemplary embodiment described above.

Variation 1

Note that although the exemplary embodiment described above was explained for a case in which there are seated occupants in all of the vehicle seats 12 and control of the posture of all of the vehicle seats 12 similar to the above control is employed in cases in which there are seated occupants only in some of the vehicle seats 12, the following changes may also be made to the control.

In the seat control device 10 according to variation 1, the CPU 60A selects the video display area for video display from operation of the selection switch 30 by an occupant, and for example selects the video display area 22A of the front windshield 22. In such cases the CPU 60A detects from the output signal of the occupant detection mechanism 40 that there are seated occupants present in the vehicle seats 12A, 12B and that the vehicle seats 12C, 12D are empty (there are no seated occupants therein) (see FIG. 11). In such cases the CPU 60A reads the setting conditions based on the above conditions from the setting information 110 of the storage 60D (see step S108).

Note that setting conditions are respectively stored in the setting information 110 based on the selected video display area and on seated seat information (information about (arrangement of) the vehicle seats 12 in which the occupants is seated).

The posture of each of the vehicle seats 12 is adjusted by computing an adjustment amount of the vehicle seat 12, which is the difference between the setting conditions and the posture information of each of the vehicle seats 12, and by outputting a drive signal generated based on the adjustment amount to the seat modulation mechanism 80.

In the exemplary embodiment described above, as illustrated in FIG. 7A, there are seated occupants in all of the vehicle seats 12, and so moving the front row vehicle seats 12A, 12B to the left and right vehicle width direction edges and moving the rear row vehicle seats 12C. 12D toward the vehicle width direction center enables the seated occupants of the rear row vehicle seats 12C, 12D to view without finding that the front row vehicle seats 12A, 12B or the occupants seated thereon get in the way.

Figure 11:
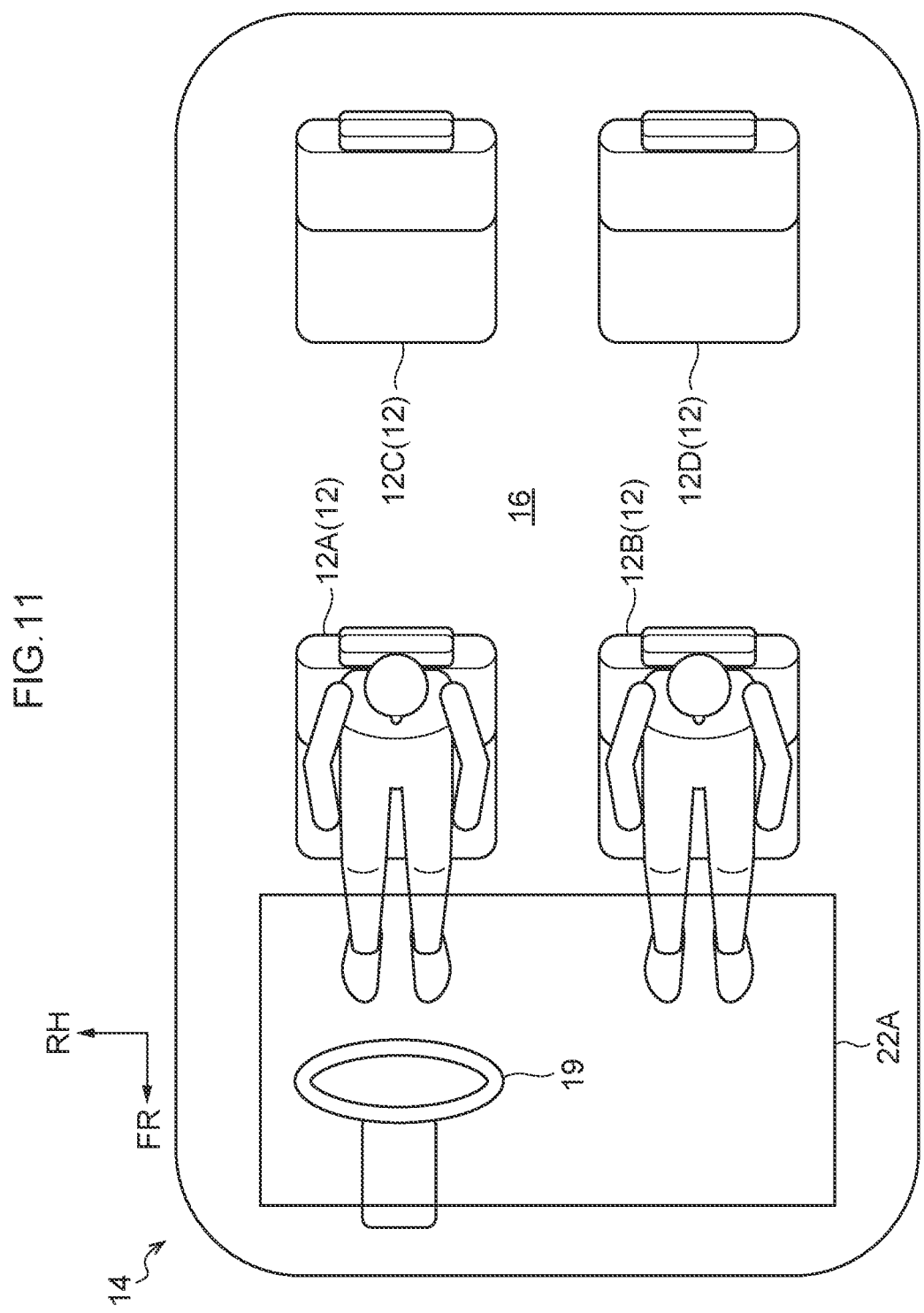
FIG. 11 is a diagram as viewed from above a vehicle schematically illustrating an arrangement of vehicle seats in a vehicle applied with a seat control device according to an exemplary embodiment for a case in which a front windshield video display area has been selected with no seated occupants in rear row vehicle seats.

However, in the present variation 1, as illustrated in FIG. 11, there are no seated occupants in the rear row vehicle seats 12C, 12D, and so the position of each of the vehicle seats 12 is not moved.

Thus the posture control of the vehicle seats 12 is performed in this manner based on the setting conditions that consider the vehicle seats 12 in which the occupants is seated (the arrangement thereof), and this enables the modulation amount of the vehicle seats 12 to be suppressed.

Note that although in the present variation 1 an example is given of a case in which the video display area 22A of the front windshield 22 is selected, similar applies to cases in which other video display areas are selected. For example, in cases in which the video display areas 20FA, 20RA of the ceiling 20 are selected and there are no seated occupants in the rear row vehicle seats 12C, 12D, only the front row vehicle seats 12A, 12B are moved to below the video display area 20FA and a large reclining angle is set therein, and the postures of the vehicle seats 12A, 12B are modulated such that the faces of the seated occupants face toward the video display area 20FA (not illustrated, see FIG. 6A and FIG. 6B for reference). In other words, posture control is not performed on the vehicle seats 12C, 12D and they are maintained in their initial state. Namely, it is sufficient to modulate the postures of only the vehicle seats 12A, 12B, and so the modulation amount of the vehicle seats 12 is suppressed.

Variation 2

Figure 12:
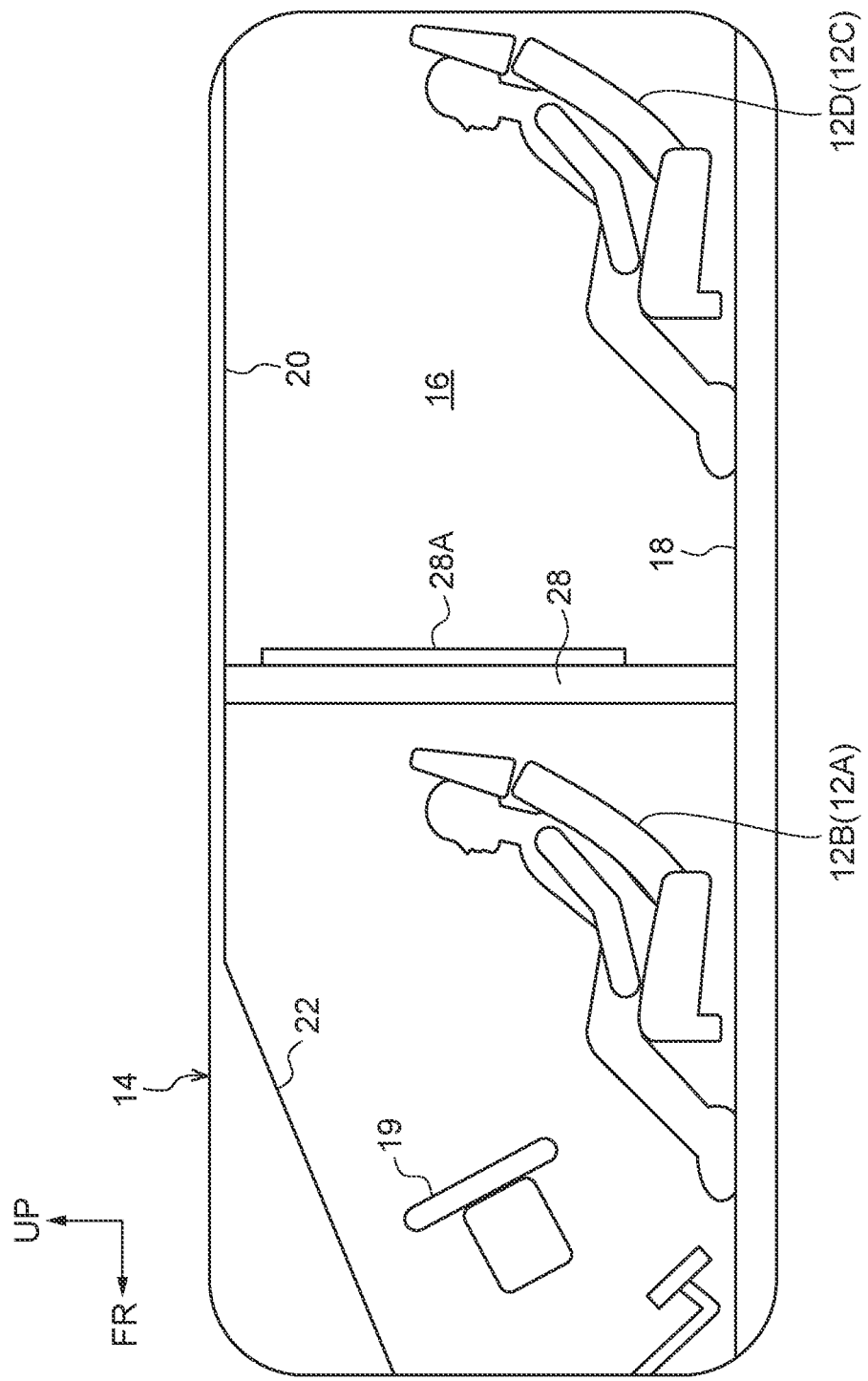
FIG. 12 is a diagram as viewed from a vehicle side schematically illustrating an arrangement of vehicle seats in a vehicle applied with a seat control device according to an exemplary embodiment for a case in which a partition video display area has been selected.

In the vehicle 14 applied with the seat control device according to variation 2, as illustrated in FIG. 12, a partition wall 28 is provided so as to extend in the vehicle width direction and vehicle height direction in the vehicle cabin 16. The vehicle cabin 16 is accordingly partitioned by the partition wall 28 into a front row vehicle seats 12A, 12B-side and a rear row vehicle seats 12C, 12D-side. A video display area 28A is provided on the vehicle rear side of the partition wall 28.

Moreover, the selection switch 30 is further provided with a PARTITION switch 36 so as to indicate that the selected video display area is the partition wall 28, as illustrated by the double-dot broken lines in FIG. 3.

Operation

In cases in which an occupant has selected the PARTITION switch 36 with the selection switch 30, similarly to as described above and as illustrated in FIG. 12, the CPU 60A selects that the video display area 28A provided on the partition wall 28 is the area for video display (step S102). Moreover, the CPU 60A reads from the setting information 110 the setting conditions based on the seated seat information (for example, that there are seated occupants in all of the vehicle seats 12) and on the selected video display area. Furthermore, the CPU 60A computes the adjustment amount, which is a difference between the setting conditions and the posture of each of the vehicle seats 12, and outputs a drive signal generated based on the adjustment amount to the seat modulation mechanism 80.

The seat slider mechanism 84 is driven by the drive signal, and as illustrated in FIG. 12, the rear row vehicle seats 12C, 12D are moved toward the vehicle rear, so as to achieve a specific distance of separation from the partition wall 28 (the video display area 28A).

Effects

Achieving a specific distance of separation from the partition wall 28 (the video display area 28A) by moving the rear row vehicle seats 12C, 12D toward the vehicle rear means that a video displayed on the video display area 28A becomes more easy to view by seated occupants in the rear row vehicle seats 12C, 12D.

Namely, this enables the vehicle seats 12 to be modulated automatically to an easy viewing posture without each of the seated occupants of the rear row vehicle seats 12C, 12D modulating the posture of each of the vehicle seats 12.

Variation 3

In the seat control device 10 according to variation 3, in cases in which the SIDE L switch 34 and the SIDE R switch 33 have both been pressed twice in quick succession by an occupant using the selection switch 30, the vehicle seats 12 are posture controlled for individual seated occupant viewing on the respective video display areas 24R1A, 24R2A, 24L1A, 24L2A.

Operation

In cases in which the SIDE L switch 34 and the SIDE R switch 33 have both been pressed twice in quick succession by an occupant using the selection switch 30, as illustrated in FIG. 12, the CPU 60A selects that the video display areas 24R1A, 24R2A, 24L1A, 24L2A provided on the side glasses 24R1, 24R2, 24L1, 24L2 are the area for video display (step S102). Moreover, the CPU 60A reads from the setting information 110 the setting conditions based on the seated seat information (for example, that there are seated occupants in all of the vehicle seats 12) and on the selected video display area. Furthermore, the CPU 60A computes the adjustment amount, which is a difference between the setting conditions and the posture of each of the vehicle seats, and outputs a drive signal generated based on the adjustment amount to the seat modulation mechanism 80.

Figure 13:
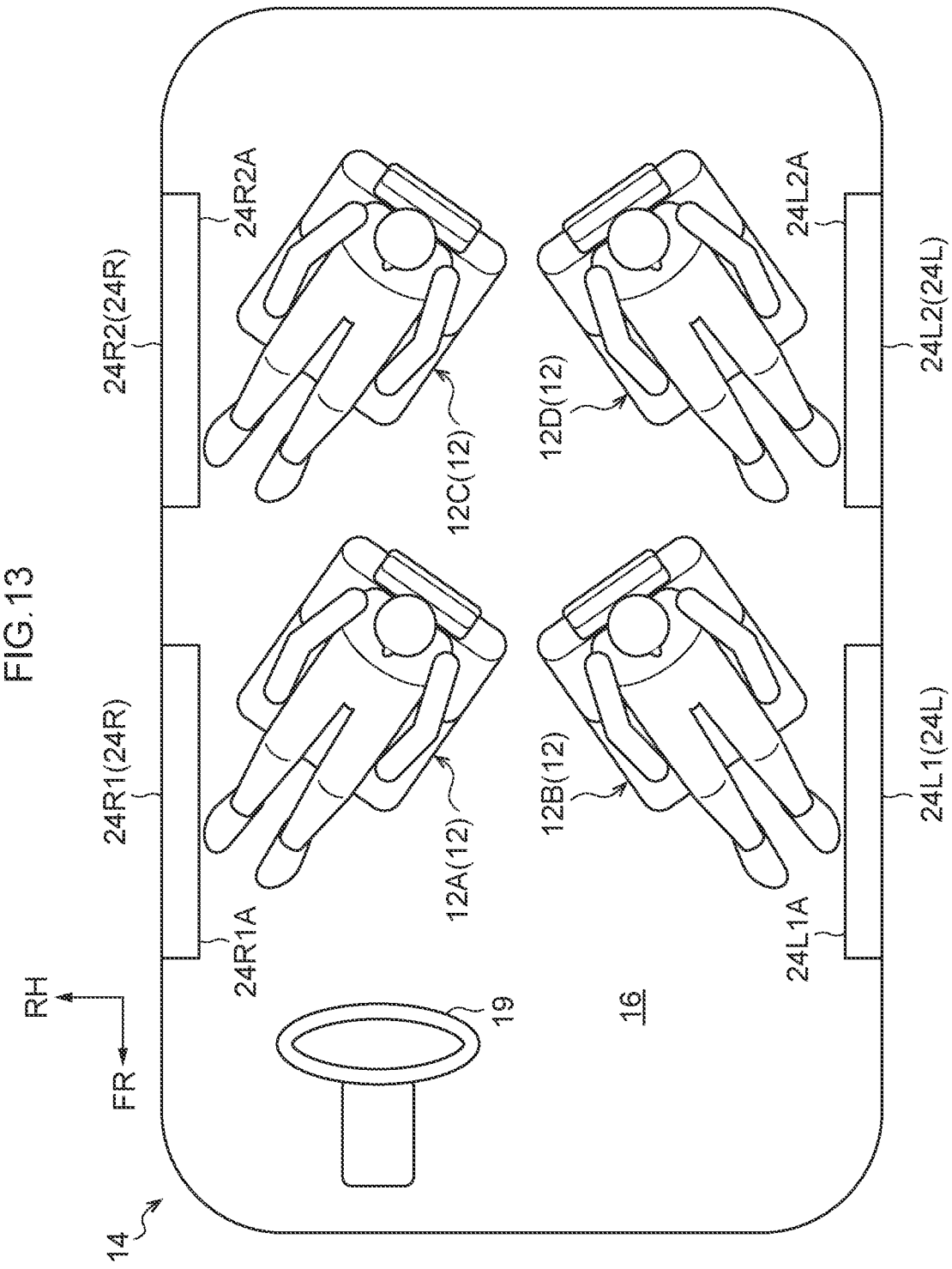
FIG. 13 is a diagram as viewed from above a vehicle schematically illustrating an arrangement of vehicle seats in a vehicle applied with a seat control device according to an exemplary embodiment for a case in which side glass video display areas have been selected for individual viewing by seated occupants.

In such cases the seat rotation mechanism 88 is driven by the drive signal. Thereby, as illustrated in FIG. 13, the right side vehicle seats 12A, 12C are made to face from the vehicle forward direction toward the vehicle width direction right side in plan view, and the left side vehicle seats 12B, 12D are made to face from the vehicle forward direction toward the vehicle width direction left side in plan view. Namely, the right side vehicle seats 12A, 12C are respectively made to face toward the video display areas 24R1A, 24R2A set on the right side glasses 24R1, 24R2, and the left side vehicle seats 12B, 12D are made to face toward the video display areas 24L1A, 24L2A set on the left side glasses 24L1, 24L2.

Effects

The right side vehicle seats 12A, 12C are made to face toward the right side video display areas 24R1A, 24R2A and the left side vehicle seats 12B, 12D are made to face toward the left side video display areas 24L1A, 24L2A in this manner, and so the seated occupants of each of the vehicle seats 12 face toward the respective video display areas 24R1A, 24R2A, 24L1A. 24L2A, facilitating viewing of a video displayed on each of the video display areas. Moreover, the occupant seated in each of the vehicle seats 12 is individual viewing the respective video display areas 24R1A, 24R2A, 24L1A, 24L2A, enabling different videos to be streamed to each of the respective video display areas 24R1A, 24R2A, 24L1A, 24L2A.

Other

Note that although explanation has been given above regarding the processing program 100 according to the present disclosure in a format pre stored (installed) on the storage 60D of the controller 60, the processing program 100 according to the present disclosure may be distributed stored on a non-transitory storage medium such as an HDD, SSD, DVD or the like so as to be executed by a processor such as the CPU 60A or the like.

Furthermore, although in the present exemplary embodiment there are pre-set setting conditions of postures of vehicle seats that enable the posture of the occupants to be relaxed in a posture enabling viewing, the setting conditions may be modulated in accordance with the individual physique of the occupants. For example, in a case in which the sitting height (eyepoint) acquired by imaging with the in-cabin camera 42 is found to be lower by at least a specific value than the sitting height (eyepoint) anticipated for an occupant (for example, in the case of a child), then a change to the adjustment amount so as to raise the height of the vehicle seat 12 may be considered. Namely, the video displayed on the video display area might be made easier to view by an occupant by driving the tilt mechanism 82 so as to raise the vehicle seat 12.

Moreover, although in a series of exemplary embodiments the facing (facing-direction), the vehicle front-rear direction position, the vehicle width direction position, the reclining angle and the like of the vehicle seat 12 are set by the controller 60 in accordance with the selected video display area, and modulation made by the seat modulation mechanism 80, any one or more out of the facing (facing-direction), the vehicle front-rear direction position, the vehicle width direction position, or the reclining angle of the vehicle seat 12 may be set by the controller 60 and then this/these alone modulated by the seat modulation mechanism 80.

Furthermore, although in the seat control of the present exemplary embodiment the vehicle seats 12 are modulated to a state enabling viewing of a video, a configuration may be adopted such that the vehicle seats 12 are returned to their original positions after the video has finished.

Moreover, although in the present exemplary embodiment selection of the video display area is performed by the occupant pressing the selection switch 30, another method may be employed therefor. For example, the selection may be made by touch panel operation or by voice input.

Furthermore, although in the present exemplary embodiment the posture/position of each of the vehicle seats 12 is modulated based on the adjustment amount, which is a difference between the setting conditions and the posture/position of each of the vehicle seats 12, there is no limitation thereto. For example, an adjustment amount may be set such that the posture/position of each of the vehicle seats 12 can be modulated to a maximum limit, and then modulation of the vehicle seats 12 stopped by detecting that the vehicle seats 12 have reached the target positions or target reclining angle, such that the vehicle seat 12 is modulated to a specific posture/position.

What is claimed is:

1. A seat control device, comprising:
   a memory; and
   a processor coupled to the memory, wherein the processor is configured to:
   based on a selection by an occupant of a vehicle, select a video display area for displaying a video from among a plurality of video display areas, including a front windshield provided at the vehicle;
   determine an adjustment amount corresponding to the selected video display area for a plurality of vehicle seats, including a front seat and a rear seat, provided in the vehicle;
   modulate a position and posture of the plurality of vehicle seats based on the determined adjustment amount of the plurality of vehicle seats;
   determine the adjustment amount for the position of the plurality of vehicle seats along a vehicle width direction, and a rotation angle of the plurality of vehicle seats about an axis along a vertical direction;
   via an in-cabin camera configured to image an interior of a vehicle cabin of the vehicle, detect a seated occupant seated in the plurality of vehicle seats;
   determine the vehicle seat adjustment amount in accordance with the plurality of vehicle seats in which the detected occupant is seated; and
   in a case in which the occupant selects the front windshield as the video display area and the processor detects occupants seated in the front seat and the rear seat, cause the front seat to move to a vehicle width direction edge and rotate from a vehicle forward direction to face toward a vehicle width direction inner side in a plan view so as to face a center portion of the front windshield, and cause the rear seat to move toward a vehicle width direction center.

2. The seat control device of claim 1, wherein the processor is further configured to:
   determine a setting condition for the position and posture of each vehicle seat of the plurality of vehicle seats based on the selected video display area;
   detect the position and posture of each of the vehicle seats of the plurality of vehicle seats; and determine a difference between the setting condition and the detected position and posture of the respective vehicle seats as the adjustment amount for each of the vehicle seats of the plurality of vehicle seats.

3. The seat control device of claim 1, wherein the processor is further configured to:
determine the adjustment amount for the plurality of vehicle seats along a vehicle front-rear direction and a reclining angle of a seatback section of the plurality of vehicle seats.

4. The seat control device of claim 1, wherein the processor is further configured to:
via the in-cabin camera, detect an eye point of the occupant seated in the plurality of vehicle seats; and
determine the vehicle seat adjustment amount in accordance with the eye point of the occupant.

5. A seat control method executed by a processor, the method comprising:
based on a selection by an occupant of a vehicle, selecting a video display area for displaying a video from among a plurality of video display areas, including a front windshield provided at the vehicle;
determining an adjustment amount corresponding to the selected video display area for a plurality of vehicle seats, including a front seat and a rear seat provided in the vehicle;
modulating a position and posture of the plurality of vehicle seats based on the determined vehicle seat adjustment amount;
determining the adjustment amount for the position of the plurality of vehicle seats along a vehicle width direction, and a rotation angle of the plurality of vehicle seats about an axis along a vertical direction;
via an in-cabin camera configured to image an interior of a vehicle cabin of the vehicle, detecting a seated occupant seated in the plurality of vehicle seats;
determining the vehicle seat adjustment amount in accordance with the plurality of vehicle seats in which the detected occupant is seated; and
in a case in which the occupant selects the front windshield as the video display area and the processor detects occupants seated in the front seat and the rear seat, causing the front seat to move to a vehicle width direction edge and rotate from a vehicle forward direction to face toward a vehicle width direction inner side in a plan view so as to face a center portion of the front windshield, and causing the rear seat to move toward a vehicle width direction center.

6. The seat control method of claim 5, further comprising:
determining a setting condition for the position and posture of each vehicle seat of the plurality of vehicle seats based on the selected video display area;
detecting the position and posture of each of the vehicle seats of the plurality of vehicle seats; and
determining a difference between the setting condition and the detected position and posture of the respective vehicle seats as the adjustment amount for each of the vehicle seats of the plurality of vehicle seats.

7. The seat control method of claim 5, further comprising:
determining the adjustment amount for the plurality of vehicle seats along a vehicle front-rear direction and a reclining angle of a seatback section of the plurality of vehicle seats.

8. The seat control method of claim 5, further comprising:
via the in-cabin camera, detecting an eye point of the occupant seated in the plurality of vehicle seats; and
determining the vehicle seat adjustment amount in accordance with the eye point of the occupant.

9. A non-transitory storage medium storing a seat control program executable by a processor to perform seat control processing, the seat control processing comprising:
based on a selection by an occupant of a vehicle, selecting a video display area for displaying a video from among a plurality of video display areas, including a front windshield provided at the vehicle;
determining an adjustment amount corresponding to the selected video display area for a plurality of vehicle seats, including a front seat and a rear seat provided in the vehicle;
modulating a position and posture of the plurality of vehicle seats based on the determined vehicle seat adjustment amount;
determining the adjustment amount for the position of the plurality of vehicle seats along a vehicle width direction, and a rotation angle of the plurality of vehicle seats about an axis along a vertical direction;
via an in-cabin camera configured to image an interior of a vehicle cabin of the vehicle, detecting a seated occupant seated in the plurality of vehicle seats;
determining the vehicle seat adjustment amount in accordance with the plurality of vehicle seats in which the detected occupant is seated; and
in a case in which the occupant selects the front windshield as the video display area and the processor detects occupants seated in the front seat and the rear seat, causing the front seat to move to a vehicle width direction edge and rotate from a vehicle forward direction to face toward a vehicle width direction inner side in a plan view so as to face a center portion of the front windshield, and causing the rear seat to move toward a vehicle width direction center.

10. The non-transitory storage medium of claim 9, the seat control processing further comprising:
determining a setting condition for the position and posture of each vehicle seat of the plurality of vehicle seats based on the selected video display area;
detecting the position and posture of each of the vehicle seats of the plurality of vehicle seats; and
determining a difference between the setting condition and the detected position and posture of the respective vehicle seats as the adjustment amount for each of the vehicle seats of the plurality of vehicle seats.

11. The non-transitory storage medium of claim 9, the seat control processing further comprising:
determining the adjustment amount for the plurality of vehicle seats along a vehicle front-rear direction and a reclining angle of a seatback section of the plurality of vehicle seats.

12. The non-transitory storage medium of claim 9, wherein the seat control processing further comprising:
via the in-cabin camera, detecting an eye point of the occupant seated in the plurality of vehicle seats; and
determining the vehicle seat adjustment amount in accordance with the eye point of the occupant.

* * * * *